United States Patent
Akane et al.

(10) Patent No.: US 8,238,550 B2
(45) Date of Patent: Aug. 7, 2012

(54) PAIRING COMPUTATION DEVICE, PAIRING COMPUTATION METHOD AND RECORDING MEDIUM RECORDING PAIRING COMPUTATION PROGRAM

(75) Inventors: Masataka Akane, Okayama (JP);
Yasuyuki Nogami, Okayama (JP);
Yoshitaka Morikawa, Okayama (JP)

(73) Assignee: National University Corporation Okayama University, Okayama-shi (JP)

( * ) Notice: Subject to any disclaimer, the term of this patent is extended or adjusted under 35 U.S.C. 154(b) by 261 days.

(21) Appl. No.: 12/740,587

(22) PCT Filed: Oct. 29, 2008

(86) PCT No.: PCT/JP2008/069683
§ 371 (c)(1),
(2), (4) Date: May 17, 2010

(87) PCT Pub. No.: WO2009/057656
PCT Pub. Date: May 7, 2009

(65) Prior Publication Data
US 2010/0260333 A1    Oct. 14, 2010

(30) Foreign Application Priority Data
Oct. 30, 2007    (JP) ................. 2007-282487

(51) Int. Cl.
*G06F 7/04*    (2006.01)
*G06F 17/30*    (2006.01)
*H04N 7/16*    (2011.01)

(52) U.S. Cl. ........................................................ 380/28

(58) Field of Classification Search .................. None
See application file for complete search history.

(56) References Cited

FOREIGN PATENT DOCUMENTS
JP    2005-316267    11/2005

OTHER PUBLICATIONS

Akane et al., An Improvement of Miller's Algorithm in Ate Pairing with Barreto-Naehrig Curve, Oct. 31, 2007, vol. 2007, No. 10, pp. 489-494.*
Akane et al., Efficient Parameters for Ate Pairing Computation with Barreto-Naehrig Curve, Oct. 31, 2007, vol. 2007, No. 10, pp. 495-500.*
Matsuda et al., Optimised Versions of the Ate and Twisted Ate Pairings, 2007, Springer-Verlag Berlin Heidelberg, Cryptography and Coding 2007, LNCS 4887, pp. 302-312.*
Devegili et al, Implementing Cryptographic Pairings over Barreto-Naehrig Curves, 2007, Springer-Verlag Berlin Heidelberg, Pairing 2007, LNCS 4575, pp. 197-207.*

(Continued)

*Primary Examiner* — Nasser Goodarzi
*Assistant Examiner* — Trong Nguyen
(74) *Attorney, Agent, or Firm* — Jordan and Hamburg LLP

(57) ABSTRACT

There is provided a pairing computation device, a pairing computation method and a recording medium recording a pairing computation program all enabling a pairing computation at high speed. In the case where the Ate pairing $e(Q,P)$ is defined as in equation (1) and k is any one of even, a multiple of 3, a multiple of 4, and a multiple of 6, arithmetic operations of a rational function which is required to derive the Miller function $f_{s,Q}(P)$ are performed on the proper subfield specified by a twist curve using a quadratic and cubic non-residue v which becomes 1 when an exponentiation of this $f_{s,Q}(P)$ to the power of $(q^k-1)/r$ is performed.

12 Claims, 3 Drawing Sheets

OTHER PUBLICATIONS

Seiichi Matsuda, et al., "Twisted Ate Pairing no Kosokuka Shuho no Teian", IEICE Technical Report (ISEC 2006-101~114), Dec. 6, 2006, vol. 106, No. 411, pp. 29 to 34.

Masaaki Shirase, et al., "Tate Pairing no Koritsuteki na Algorithm", Information Processing Society of Japan Kenkyu Hokoku (2006-CSEC-34), Jul. 20, 2006, vol. 2006, No. 81, pp. 19 to 26.

Takumi Okimoto, et al., "Twist o Mochiita Kokateki na Pairing no Jissoho", Computer Security Symposium 2006 Ronbunshu, Oct. 25, 2006, vol. 2006, No. 11, pp. 37 to 42.

Yasuyuki Nogami, et al., "Twist o Mochiita Pairing Keisan no Kosokuka shuho", Dai 4 Kai Shanon Riron Workshop, 2006, pp. 7 to 12.

Masataka Akane, et al., "Barreto-Naehrig Kyokusen o Mochiita Ate Pairing ni Okeru Miller Algorithm no Kairyo", Computer Security Symposium 2007 Ronbunshu, Oct. 31, 2007, vol. 2007, No. 10, pp. 489 to 494.

Masataka Akane, et al., "Ate Pairing ni Tekishita Barreto-Naehrig Kyokusen no Parameter Settei", Computer Security Symposium 2007 Ronbunshu, Oct. 31, 2007, vol. 2007, No. 10, pp. 495 to 500.

\* cited by examiner

Fig. 1

| INPUT : $s = t - 1$, $P \in E(\mathbb{F}_p)$, $Q \in E(\mathbb{F}_{p^{12}})$ |
|---|
| OUTPUT $f_{s,Q}(P)$ |

1.     $f \leftarrow 1$, $T \leftarrow Q$.
2.     For $i = \lceil \log_2(s) \rceil$ downto 1:
3.        $f \leftarrow f^2 \cdot l_{T,T}(x_P, y_P)$.
4.        $T \leftarrow 2T$.
5.        If $s[i] = 1$, then:
6.           $f \leftarrow f \cdot l_{T,Q}(x_P, y_P)$.
7.           $T \leftarrow T + Q$.
8.        End if.
9.     End for.
10.    Return $f$.

Fig. 2

| INPUT : $s = t - 1$, $P \in E(\mathbb{F}_p)$, $Q' \in E'(\mathbb{F}_{p^2})$ |
|---|
| OUTPUT $f_{s,Q}(P)$ |

1.     $n \leftarrow x_P v^{-1/3}$, $m \leftarrow y_P v^{-1/2}$.
2.     $f \leftarrow 1$, $T' \leftarrow Q'$.
3.     For $i = \lceil \log_2(s) \rceil$ downto 1:
4.        $f \leftarrow f^2 \cdot l_{T',T'}(n, m)$.
5.        $T' \leftarrow 2T'$.
6.        If $s[i] = 1$, then:
7.           $f \leftarrow f \cdot l_{T',Q'}(n, m)$.
8.           $T' \leftarrow T' + Q'$.
9.        End if.
10.    End for.
11.    Return $f$.

PAIRING COMPUTATION DEVICE, PAIRING COMPUTATION METHOD AND RECORDING MEDIUM RECORDING PAIRING COMPUTATION PROGRAM

FIELD OF THE INVENTION

The present invention relates to a pairing computation device, a pairing computation method, and a non-transitory recording medium recording a paring computation program all enabling a pairing computation at high speed.

DESCRIPTION OF THE RELATED ART

Recently, since there have been available high speed telecommunication lines at low prices, on a network such as the Internet, it has been possible to provide various services such as distribution of music or video, Internet banking, and electronic application to administrative agencies.

Further, corporate business styles have changed, such that it has been made possible, using so-called mobile terminals such as a notebook PC or a mobile phone, to access the company's server system from an outside location to input or get various kinds of information.

Particularly in Japan, services in which mobile phones are used as connecting terminals to a network are satisfactory, so that advent of so-called ubiquitous society in which users can access the required network from anywhere to get various kinds of information or to use services has become more likely.

In accessing a network in this way to get various kinds of information or to use services, it has been made possible to get information or to use services by the fact that authentication processing is performed through an authentication server equipped with required authentication means and a user who has accessed the network is authenticated as one of the certain users registered in advance.

Particularly in recent years, since, using digital signature technology, it has been made possible to safely deal with even highly-confidential information on a network by enabling to guarantee that the information dealt with is not altered by a third party or is not leaked to a third party, more active use of a network has become popular.

However, in this digital signature, since an individual user is identified, a history of the user is to be accumulated as information based on an authentication processing in an authentication server. This history information is a kind of private information, and hence, there has been a problem of protection of private information.

Accordingly, there has been proposed to use digital group signature which is extended from the digital signature. In the case where the digital group signature is used, a user sends anonymously to an authentication server a signature data which only certifies that the user belongs to a certain group, then the authentication server authenticates that the user belongs to the prescribed group based on the received signature data without identifying the individual user. Therefore, while it is possible to prevent accumulating history information on each individual user's usage in the authentication server, it is also possible to block unfair use by users who do not belong to the group.

Here, in the anonymous authentication in the digital group signature, a pairing computation has been used. In the pairing computation, arithmetic operations using a function of 2 inputs and 1 output are performed. It takes advantage of the fact that, for example, letting P be a rational point over a prime field $F_q$, and Q be a rational point over a finite extension field $F_q^k$ of degree k, in the case of pairing where P and Q are inputted and an element z in the finite extension field $F^*{}_q^k$ is outputted, when a times of P and b times of Q are inputted, an ab-th power of z is calculated. The property like this is called bilinearity. In addition, here, "k" is called an embedding degree, and "$F^*{}_q^k$" is meant to be correctly displayed as in the following representation, but due to display restrictions, it is denoted as "$F^*{}_q^k$".

$$F^*{}_q^k$$

In general, as rational points P and Q, points on an elliptic curve are used respectively. A pairing computation on the elliptic curve like this consists of a step of performing arithmetic operations using Miller's algorithm and a step of performing arithmetic operations at the final exponentiation.

For example, in a digital group signature whose group consists of 10000 members, there has been known a method which, when the digital group signature performs verification, performs a pairing computation for members who invalidated their right in order to make it possible to flexibly correspond to validation and invalidation of access right of each member. In this case, supposing 100 members who invalidated their right, there requires 100 times of the pairing computation. Since one pairing computation by a currently general electronic computer requires approximately 0.1 second, 100 times of the pairing computation comes to require 10 seconds, and hence, use of the pairing computation in a large scale digital group signature system has not been practical.

Accordingly, various kinds of development have been made to improve pairing computation speed. For example, there has been proposed an acceleration technique for pairing computation defined on an elliptic curve over a finite field (see Patent Document 1 for example).

Patent Document 1: JP-A-2005-316267.

SUMMARY OF THE INVENTION

However, currently proposed acceleration techniques for pairing computation have not yet come to the speed suited for the use in a large scale digital group signature, and hence, there has been a problem that the number of members of the digital group signature must be limited.

The inventors, in view of the present situation, have made a study to speed up pairing computation and have made the present invention.

According to a first aspect of the present invention, there is provided a pairing computation device, wherein an elliptic curve equation is given as $y^2 = x^3 + ax + b$, $a \in F_q$, $b \in F_q$ (q: a power of a prime number greater than 3), letting an embedding degree be 2h-th degree (h: a natural number), E be an additive group constituted of rational points on a pairing-enabled elliptic curve defined over $F_q^{2h}$, $E[r]$ be a set of rational points of prime order r, and $\phi_q$ be the Frobenius endomorphism, the Ate pairing e is defined, using $$G_1 = E[r] \cap Ker(\phi_q - [1])$$

$$G_2 = E[r] \cap Ker(\phi_q - [q]),$$

as a non-degenerate bilinear map
$e: G_2 \times G_1 \to F^*{}_q^{2h} / (F^*{}_q^{2h})^r$,
letting $P \in G_1$, $Q \in G_2$, and letting $s = t - 1$ using a trace t of the Frobenius endomorphism $\phi_q$, and using the Miller function $f_{s,Q}(\cdot)$, the Ate pairing $e(Q,P)$ is computed as $$e(Q, P) = f_{s,Q}(P)^{\frac{q^{2h}-1}{r}},\qquad \text{[E14]}$$

the pairing computation device characterized by comprising:
in order to perform an arithmetic operation of a rational function which is required to derive $f_{s,Q}(P)$ on the proper subfield by a twist curve of $E(F_q^h)$, that is, $E'(F_q^h):y^2=x^3+av^{-2}x+bv^{-3}$ using $v \in F_q^h$ which is a quadratic non-residue element and becomes 1 by an exponentiation of $f_{s,Q}(P)$ to the power of $(q^{2h}-1)/r$.

In particular, the pairing computation device is characterized in that it includes:

an input unit which is configured to receive inputs of said $s=t-1$, P which satisfies $P \in E(F_q)$, and Q' which satisfies $Q' \in E'(F_q^h)$;

a substitution unit which is configured to perform substitution operations $n \leftarrow x_p v^{-1}$, $m \leftarrow y_p v^{-3/2}$ with respect to coordinates of the rational point P $(x_p, y_p)$ and to perform substitution operations $f \leftarrow 1$, $T' \leftarrow Q'$;

a first arithmetic operation unit which is configured to calculate $1_{T,T}(x_p, y_p)v^{-3/2}$ as $1_{T',T'}(n,m)$, instead of calculating $1_{T,T}(x_p, y_p)$ which is a value substituted by coordinates $(x_p, y_p)$ of the rational point P in the left hand side of an equation $1_{T,T}(x,y)=0$ of the tangent line passing through the rational point T, and to perform a substitution operation $f \leftarrow f^2 \cdot 1_{T',T'}(n,m)$;

a second arithmetic operation unit which is configured to perform a substitution operation $T' \leftarrow 2T'$;

a third arithmetic operation unit which is configured, when a value of the predetermined bit of s in binary representation is 1, to calculate $1_{T,Q}(x_p, y_p)v^{-3/2}$ as $1_{T',Q'}(n,m)$, instead of calculating $1_{T,Q}(x_p, y_p)$ which is a value substituted by coordinates of the rational point P in the left hand side of an equation $1_{T,Q}(x,y)=0$ of the straight line passing through the rational points T and Q, and to perform a substitution operation $f \leftarrow f \cdot 1_{T',Q'}(n,m)$;

a fourth arithmetic operation unit which is configured, when a value of the predetermined bit of s in binary representation is 1, to perform a substitution operation $T' \leftarrow T'+Q'$; and a fifth arithmetic operation unit which is configured to perform an exponentiation operation to the power of $(q^{2h}-1)/r$.

According to a second aspect of the present invention, there is provided a pairing computation device, wherein an elliptic curve equation is given as $y^2=x^3+a$, $a \in F_q$ (q: a power of a prime number greater than 3), letting an embedding degree be 3h-th degree (h: a natural number), E be an additive group constituted of rational points on a pairing-enabled elliptic curve defined over $F_q^{3h}$, $E[r]$ be a set of rational points of prime order r, and $\phi_q$ be the Frobenius endomorphism, the Ate pairing e is defined, using $G_1=E[r]\cap Ker(\phi_q-[1])$ $G_2=E[r]\cap Ker(\phi_q-[q])$, as a non-degenerate bilinear map, $e: G_2 \times G_1 \to F^*_{q^{3h}}/(F^*_{q^{3h}})^r$ and letting $P \in G_1$, $Q \in G_2$, and letting $s=t-1$ using a trace t of the Frobenius endomorphism $\phi_q$, and using the Miller function $f_{s,Q}(\cdot)$, the Ate pairing $e(Q,P)$ is computed as $$e(Q, P) = f_{s,Q}(P)^{\frac{q^{3h}-1}{r}},\qquad \text{[E15]}$$

the pairing computation device characterized by comprising:
in order to perform an arithmetic operation of a rational function which is required to derive $f_{s,Q}(P)$ on the proper subfield by a twist curve of $E(F_q^h)$, that is, $E'(F_q^h):y^2=x^3+av^{-1}$ using $v \in F_q^h$ which is a quadratic and cubic non-residue element and becomes 1 by an exponentiation of $f_{s,Q}(P)$ to the power of $(q^{3h}-1)/r$.

In particular, the pairing computation device is characterized in that it includes:

an input unit which is configured to receive inputs of said $s=t-1$, P which satisfies $P \in E(F_q)$, and Q' which satisfies $Q' \in E'(F_q^h)$;

a substitution unit which is configured to perform substitution operations $n \leftarrow x_p v^{-1/3}$, $m \leftarrow y_p v^{-1/2}$ with respect to coordinates of the rational point P $(x_p, y_p)$ and to perform substitution operations $f \leftarrow 1$, $T' \leftarrow Q'$;

a first arithmetic operation unit which is configured to calculate $1_{T,T}(x_p, y_p)v^{-1/2}$ as $1_{T',T'}(n,m)$, instead of calculating $1_{T,T}(x_p, y_p)$ which is a value substituted by coordinates $(x_p, y_p)$ of the rational point P in the left hand side of an equation $1_{T,T}(x,y)=0$ of the tangent line passing through the rational point T, and to perform a substitution operation $f \leftarrow f^2 \cdot 1_{T',T'}(n,m)$;

a second arithmetic operation unit which is configured to perform a substitution operation $T' \leftarrow 2T'$;

a third arithmetic operation unit which is configured, when a value of the predetermined bit of s in binary representation is 1, to calculate $1_{T,Q}(x_p, y_p)v^{-1/2}$ as $1_{T',Q'}(n,m)$, instead of calculating $1_{T,Q}(x_p, y_p)$ which is a value substituted by coordinates of the rational point P in the left hand side of an equation $1_{T,Q}(x,y)=0$ of the straight line passing through the rational points T and Q, and to perform a substitution operation $f \leftarrow f \cdot 1_{T',Q'}(n,m)$;

a fourth arithmetic operation unit which is configured, when a value of the predetermined bit of s in binary representation is 1, to perform a substitution operation $T' \leftarrow T'+Q'$; and a fifth arithmetic operation unit which is configured to perform an exponentiation operation to the power of $(q^{3h}-1)/r$.

According to a third aspect of the present invention, there is provided a pairing computation device, wherein an elliptic curve equation is given as $y^2=x^3+ax$, $a \in F_q$ (q: a power of a prime number greater than 3), letting an embedding degree be 4h-th degree (h: a natural number), $q^h-1$ be dividable by 4, E be an additive group constituted of rational points on a pairing-enabled elliptic curve defined over $F_q^{4h}$, $E[r]$ be a set of rational points of prime order r, and $\phi_q$ be the Frobenius endomorphism, the Ate pairing e is defined, using $G_1=E[r]\cap Ker(\phi_q-[1])$ $G_2=E[r]\cap Ker(\phi_q-[q])$ as a non-degenerate bilinear map $e: G_2 \times G_1 \to F^*_{q^{4h}}/(F^*_{q^{4h}})^r$, and letting $P \in G_1$, $Q \in G_2$, and letting $s=t-1$ using a trace t of the Frobenius endomorphism $\phi_q$, and using the Miller function $f_{s,Q}(\cdot)$, the Ate pairing $e(Q,P)$ is computed as $$e(Q, P) = f_{s,Q}(P)^{\frac{q^{4h}-1}{r}}, \quad [E16]$$

the pairing computation device characterized by comprising: in order to perform an arithmetic operation of a rational function which is required to derive $f_{s,Q}(P)$ on the proper subfield by a twist curve of $E(F_q^h)$, that is, $E'(F_q^h):y^2=x^3+av^{-1}x$ using $v \in F_q^h$ which is a quadratic non-residue element and becomes 1 by an exponentiation of $f_{s,Q}(P)$ to the power of $(q^{4h}-1)/r$.

In particular, the pairing computation device is characterized in that it includes:

an input unit which is configured to receive inputs of said $s=t-1$, P which satisfies $P \in E(F_q)$, and Q' which satisfies $Q' \in E'(F_q^h)$;

a substitution unit which is configured to perform substitution operations $n \leftarrow x_p v^{-1/2}$, $m \leftarrow y_p v^{-3/4}$ with respect to coordinates of the rational point P $(x_p, y_p)$ and to perform substitution operations $f \leftarrow 1$, $T' \leftarrow Q'$;

a first arithmetic operation unit which is configured to calculate $l_{T,T}(x_p, y_p)v^{-3/4}$ as $l_{T',T'}(n,m)$, instead of calculating $l_{T,T}(x_p, y_p)$ which is a value substituted by coordinates $(x_p, y_p)$ of the rational point P in the left hand side of an equation $l_{T,T}(x,y)=0$ of the tangent line passing through the rational point T, and to perform a substitution operation $f \leftarrow f^2 \cdot l_{T',T'}(n,m)$;

a second arithmetic operation unit which is configured to perform a substitution operation $T' \leftarrow 2T'$;

a third arithmetic operation unit which is configured, when a value of the predetermined bit of s in binary representation is 1, to calculate $l_{T,Q}(x_p, y_p)v^{-3/4}$ as $l_{T',Q'}(n,m)$, instead of calculating $l_{T,Q}(x_p, y_p)$ which is a value substituted by coordinates of the rational point P in the left hand side of an equation $l_{T,Q}(x,y)=0$ of the straight line passing through the rational points T and Q, and to perform a substitution operation $f \leftarrow f \cdot l_{T',Q'}(n,m)$;

a fourth arithmetic operation unit which is configured, when a value of the predetermined bit of s in binary representation is 1, to perform a substitution operation $T' \leftarrow T'+Q'$; and a fifth arithmetic operation unit which is configured to perform an exponentiation operation to the power of $(q^{4h}-1)/r$.

According to a fourth aspect of the present invention, there is provided a pairing computation device, wherein an elliptic curve equation is given as $y^2=x^3+a$, $a \in F_q$ (q: a power of a prime number greater than 3), letting an embedding degree be 6h-th degree (h: a natural number), E be an additive group constituted of rational points on a pairing-enabled elliptic curve defined over $F_q^{6h}$, E[r] be a set of rational points of prime order r, and $\phi_q$ be the Frobenius endomorphism, the Ate pairing e is defined, using $$G_1 = E[r] \cap Ker(\phi_q - [1])$$

$$G_2 = E[r] \cap Ker(\phi_q - [q]),$$

as a non-degenerate bilinear map $$e: G_2 \times G_1 \to F^*_q{}^{6h}/(F^*_q{}^{6h})^r,$$

and letting $P \in G_1$, $Q \in G_2$, and letting $s=t-1$ using a trace t of the Frobenius endomorphism $\phi_q$, and using the Miller function $f_{s,Q}(\cdot)$, the Ate pairing $e(Q,P)$ is computed as $$e(Q, P) = f_{s,Q}(P)^{\frac{q^{6h}-1}{r}}, \quad [E17]$$

the pairing computation device characterized by comprising: in order to perform an arithmetic operation of a rational function which is required to derive $f_{s,Q}(P)$ on the proper subfield by a twist curve of $E(F_q^h)$, that is, $E'(F_q^h):y^2=x^3+av^{-1}$ using $v \in F_q^h$ which is a quadratic and cubic non-residue element and becomes 1 by an exponentiation of $f_{s,Q}(P)$ to the power of $(q^{6h}-1)/r$.

In particular, the pairing computation device is characterized in that it includes:

an input unit which is configured to receive inputs of said $s=t-1$, P which satisfies $P \in E(F_q)$, and Q' which satisfies $Q' \in E'(F_q^h)$;

a substitution unit which is configured to perform substitution operations $n \leftarrow x_p v^{-1/3}$, $m \leftarrow y_p v^{-1/2}$ with respect to coordinates of the rational point P $(x_p, y_p)$ and to perform substitution operations $f \leftarrow 1$, $T' \leftarrow Q'$;

a first arithmetic operation unit which is configured to calculate $l_{T,T}(x_p, y_p)v^{-1/2}$ as $l_{T',T'}(n,m)$, instead of calculating $l_{T,T}(x_p, y_p)$ which is a value substituted by coordinates $(x_p, y_p)$ of the rational point P in the left hand side of an equation $l_{T,T}(x,y)=0$ of the tangent line passing through the rational point T, and to perform a substitution operation $f \leftarrow f^2 \cdot l_{T',T'}(n,m)$;

a second arithmetic operation unit which is configured to perform a substitution operation $T' \leftarrow 2T'$;

a third arithmetic operation unit which is configured, when a value of the predetermined bit of s in binary representation is 1, to calculate $l_{T,Q}(x_p, y_p)v^{-1/2}$ as $l_{T',Q'}(n,m)$, instead of calculating $l_{T,Q}(x_p, y_p)$ which is a value substituted by coordinates of the rational point P in the left hand side of an equation $l_{T,Q}(x,y)=0$ of the straight line passing through the rational points T and Q, and to perform a substitution operation $f \leftarrow f \cdot l_{T',Q'}(n,m)$;

a fourth arithmetic operation unit which is configured, when a value of the predetermined bit of s in binary representation is 1, to perform a substitution operation $T' \leftarrow T'+Q'$; and a fifth arithmetic operation unit which is configured to perform an exponentiation operation to the power of $(q^{6h}-1)/r$.

According to a fifth aspect of the present invention, there is provided a pairing computation method, wherein an elliptic curve equation is given as $y^2=x^3+ax+b$, $a \in F_q$, $b \in F_q$ (q: a power of a prime number greater than 3), letting an embedding degree be 2h-th degree (h: a natural number), E be an additive group constituted of rational points on a pairing-enabled elliptic curve defined over $F_q^{2h}$, E[r] be a set of rational points of prime order r, and $\phi_q$ be the Frobenius endomorphism, the Ate pairing e is defined, using $$G_1 = E[r] \cap Ker(\phi_q - [1])$$

$$G_2 = E[r] \cap Ker(\phi_q - [q]),$$

as a non-degenerate bilinear map $$e: G_2 \times G_1 \to F^*_q{}^{2h}/(F^*_q{}^{2h})^r,$$

and letting $P \in G_1$, $Q \in G_2$, and letting $s=t-1$ using a trace t of the Frobenius endomorphism $\phi_q$, and using the Miller function $f_{s,Q}(\cdot)$, the Ate pairing $e(Q,P)$, by using an electronic computer, is computed as $$e(Q, P) = f_{s,Q}(P)^{\frac{q^{2h}-1}{r}}, \qquad [E18]$$

the pairing computation method characterized by using $v \in F_q^h$ which is a quadratic non-residue element and becomes 1 by an exponentiation of $f_{s,Q}(P)$ to the power of $(q^{2h}-1)/r$ and a twist curve of $E(F_q^h)$, that is, $E'(F_q^h): y^2 = x^3 + av^{-2}x + bv^{-3}$, and by comprising:

a step of receiving inputs of said $s = t-1$, P which satisfies $P \in E(F_q)$, and Q' which satisfies $Q' \in E'(F_q^h)$, by causing the electronic computer to function as an input unit;

a step of performing substitution operations $n \leftarrow x_p v^{-1}$, $m \leftarrow y_p v^{-3/2}$ with respect to coordinates of the rational point P $(x_p, y_p)$, by causing the electronic computer to function as a substitution unit;

a step of performing substitution operations $f \leftarrow 1$, $T' \leftarrow Q'$, by causing the electronic computer to function as a substitution unit;

a step of calculating $l_{T,T}(x_p, y_p) v^{-3/2}$ as $l_{T',T'}(n,m)$, instead of calculating $l_{T,T}(x_p, y_p)$ which is a value substituted by coordinates $(x_p, y_p)$ of the rational point P in the left hand side of an equation $l_{T,T}(x,y)=0$ of the tangent line passing through the rational point T, and performing a substitution operation $f \leftarrow f^2 \cdot l_{T',T'}(n,m)$, by causing the electronic computer to function as a first arithmetic operation unit;

a step of performing a substitution operation $T' \leftarrow 2T'$, by causing the electronic computer to function as a second arithmetic operation unit;

a step of, when a value of the predetermined bit of s in binary representation is 1, calculating $l_{T,Q}(x_p, y_p) v^{-3/2}$ as $l_{T',Q'}(n,m)$, instead of calculating $l_{T,Q}(x_p, y_p)$ which is a value substituted by coordinates of the rational point P in the left hand side of an equation $l_{T,Q}(x,y)=0$ of the straight line passing through the rational points T and Q, and performing a substitution operation $f \leftarrow f \cdot l_{T',Q'}(n,m)$, by causing the electronic computer to function as a third arithmetic operation unit;

a step of, when a value of the predetermined bit of s in binary representation is 1, performing a substitution operation $T' \leftarrow T' + Q'$, by causing the electronic computer to function as a fourth arithmetic operation unit; and a step of performing an exponentiation operation to the power of $(q^{2h}-1)/r$, by causing the electronic computer to function as a fifth arithmetic operation unit.

According to a sixth aspect of the present invention, there is provided a pairing computation method, wherein an elliptic curve equation is given as $y^2 = x^3 + a$, $a \in F_q$ (q: a power of a prime number greater than 3), letting an embedding degree be 3h-th degree (h: a natural number), E be an additive group constituted of rational points on a pairing-enabled elliptic curve defined over $F_q^{3h}$, E[r] be a set of rational points of prime order r, and $\phi_q$ be the Frobenius endomorphism, the Ate pairing e is defined, using $$G_1 = E[r] \cap Ker(\phi_q - [1])$$

$$G_2 = E[r] \cap Ker(\phi_q - [q]),$$

as a non-degenerate bilinear map $$e: G_2 \times G_1 \to F^*_q{}^{3h}/(F^*_q{}^{3h})^r,$$

and letting $P \in G_1$, $Q \in G_2$, and letting $s = t-1$ using a trace t of the Frobenius endomorphism $\phi_q$, and using the Miller function $f_{s,Q}(\bullet)$, the Ate pairing $e(Q,P)$, by using an electronic computer, is computed as, $$e(Q, P) = f_{s,Q}(P)^{\frac{q^{3h}-1}{r}}, \qquad [E19]$$

the pairing computation method characterized by using $v \in F_q^h$ which is a quadratic and cubic non-residue element and becomes 1 by an exponentiation of $f_{s,Q}(P)$ to the power of $(q^{3h}-1)/r$ and a twist curve of $E(F_q^h)$, that is, $E'(F_q^h): y^2 = x^3 + av^{-1}$, and by comprising:

a step of receiving inputs of said $s = t-1$, P which satisfies $P \in E(F_q)$, and Q' which satisfies $Q' \in E'(F_q^h)$, by causing the electronic computer to function as an input unit;

a step of performing substitution operations $n \leftarrow x_p v^{-1/3}$, $m \leftarrow y_p v^{-1/2}$ with respect to coordinates of the rational point P $(x_p, y_p)$, by causing the electronic computer to function as a substitution unit;

a step of performing substitution operations $f \leftarrow 1$, $T' \leftarrow Q'$, by causing the electronic computer to function as a substitution unit;

a step of calculating $l_{T,T}(x_p, y_p) v^{-1/2}$ as $l_{T',T'}(n,m)$, instead of calculating $l_{T,T}(x_p, y_p)$ which is a value substituted by coordinates $(x_p, y_p)$ of the rational point P in the left hand side of an equation $l_{T,T}(x,y)=0$ of the tangent line passing through the rational point T, and performing a substitution operation $f \leftarrow f^2 \cdot l_{T',T'}(n,m)$, by causing the electronic computer to function as a first arithmetic operation unit;

a step of performing a substitution operation $T' \leftarrow 2T'$, by causing the electronic computer to function as a second arithmetic operation unit;

a step of, when a value of the predetermined bit of s in binary representation is 1, calculating $l_{T,Q}(x_p, y_p) v^{-1/2}$ as $l_{T',Q'}(n,m)$, instead of calculating $l_{T,Q}(x_p, y_p)$ which is a value substituted by coordinates of the rational point P in the left hand side of an equation $l_{T,Q}(x,y)=0$ of the straight line passing through the rational points T and Q, and performing a substitution operation $f \leftarrow f \cdot l_{T',Q'}(n,m)$, by causing the electronic computer to function as a third arithmetic operation unit;

a step of, when a value of the predetermined bit of s in binary representation is 1, performing a substitution operation $T' \leftarrow T' + Q'$, by causing the electronic computer to function as a fourth arithmetic operation unit; and a step of performing an exponentiation operation to the power of $(q^{3h}-1)/r$, by causing the electronic computer to function as a fifth arithmetic operation unit.

According to a seventh aspect of the present invention, there is provided a pairing computation method, wherein an elliptic curve equation is given as $y^2 = x^3 + ax$, $a \in F_q$ (q: a power of a prime number greater than 3), letting an embedding degree be 4h-th degree (h: a natural number), $q^h - 1$ be dividable by 4, E be an additive group constituted of rational points on a pairing-enabled elliptic curve defined over $F_q^{4h}$, E[r] be a set of rational points of prime order r, and $\phi_q$ be the Frobenius endomorphism, the Ate pairing e is defined, using $$G_1 = E[r] \cap Ker(\phi_q - [1])$$

$$G_2 = E[r] \cap Ker(\phi_q - [q]),$$

as a non-degenerate bilinear map $$e: G_2 \times G_1 \to F^*_q{}^{4h}/(F^*_q{}^{4h})^r,$$

and letting $P \in G_1$, $Q \in G_2$, and letting $s = t-1$ using a trace t of the Frobenius endomorphism $\phi_q$, and using the Miller function $f_{s,Q}(\bullet)$, the Ate pairing $e(Q,P)$, by using an electronic computer, is computed as $$e(Q, P) = f_{s,Q}(P)^{\frac{q^{4h}-1}{r}}, \quad [E20]$$

the pairing computation method characterized by using $v \in F_q^h$ which is a quadratic non-residue element and becomes 1 by an exponentiation of $f_{s,Q}(P)$ to the power of $(q^{4h}-1)/r$ and a twist curve of $E(F_q^h)$, that is, $E'(F_q^h):y^2=x^3+av^{-1}x$, and by comprising:

a step of receiving inputs of said $s=t-1$, P which satisfies $P \in E(F_q)$, and Q' which satisfies $Q' \in E'(F_q^h)$, by causing the electronic computer to function as an input unit;

a step of performing substitution operations $n \leftarrow x_p v^{-1/2}$, $m \leftarrow y_p v^{-3/4}$ with respect to coordinates of the rational point P $(x_p, y_p)$, by causing the electronic computer to function as a substitution unit;

a step of performing substitution operations $f \leftarrow 1$, $T' \leftarrow Q'$, by causing the electronic computer to function as a substitution unit;

a step of calculating $1_{T,T}(x_p,y_p)v^{-3/4}$ as $1_{T',T'}(n,m)$, instead of calculating $1_{T,T}(x_p,y_p)$ which is a value substituted by coordinates $(x_p,y_p)$ of the rational point P in the left hand side of an equation $1_{T,T}(x,y)=0$ of the tangent line passing through the rational point T, and performing a substitution operation $f \leftarrow f^2 \cdot 1_{T',T'}(n,m)$, by causing the electronic computer to function as a first arithmetic operation unit;

a step of performing a substitution operation $T' \leftarrow 2T'$, by causing the electronic computer to function as a second arithmetic operation unit;

a step of, when a value of the predetermined bit of s in binary representation is 1, calculating $1_{T,Q}(x_p,y_p)v^{-3/4}$ as $1_{T',Q'}(n,m)$, instead of calculating $1_{T,Q}(x_p,y_p)$ which is a value substituted by coordinates of the rational point P in the left hand side of an equation $1_{T,Q}(x,y)=0$ of the straight line passing through the rational points T and Q, and performing a substitution operation $f \leftarrow f \cdot 1_{T',Q'}(n,m)$, by causing the electronic computer to function as a third arithmetic operation unit;

a step of, when a value of the predetermined bit of s in binary representation is 1, performing a substitution operation $T' \leftarrow T'+Q'$, by causing the electronic computer to function as a fourth arithmetic operation unit; and a step of performing an exponentiation operation to the power of $(q^{4h}-1)/r$, by causing the electronic computer to function as a fifth arithmetic operation unit.

According to a eighth aspect of the present invention, there is provided a pairing computation method, wherein an elliptic curve equation is given as $y^2=x^3+a$, $a \in F_q$ (q: a power of a prime number greater than 3), letting an embedding degree be 6h-th degree (h: a natural number), E be an additive group constituted of rational points on a pairing-enabled elliptic curve defined over $F_q^{6h}$, $E[r]$ be a set of rational points of prime order r, and $\phi_q$ be the Frobenius endomorphism, the Ate pairing e is defined, using $$G_1 = E[r] \cap Ker(\phi_q - [1])$$

$$G_2 = E[r] \cap Ker(\phi_q - [q]),$$

as a non-degenerate bilinear map $$e: G_2 \times G_1 \rightarrow F_q^{*6h}/(F_q^{*6h})^r,$$

and letting $P \in G_1$, $Q \in G_2$, and letting $s=t-1$ using a trace t of the Frobenius endomorphism $\phi_q$, and using the Miller function $f_{s,Q}(\cdot)$, the Ate pairing $e(Q,P)$, by using an electronic computer, is computed as $$e(Q, P) = f_{s,Q}(P)^{\frac{q^{6h}-1}{r}}, \quad [E21]$$

the pairing computation method characterized by using $v \in F_q^h$ which is a quadratic and cubic non-residue element and becomes 1 by an exponentiation of $f_{s,Q}(P)$ to the power of $(q^{6h}-1)/r$ and a twist curve of $E(F_q^h)$, that is, $E'(F_q^h):y^2=x^3+av^{-1}$, and by comprising:

a step of receiving inputs of said $s=t-1$, P which satisfies $P \in E(F_q)$, and Q' which satisfies $Q' \in E'(F_q^h)$, by causing the electronic computer to function as an input unit;

a step of performing substitution operations $n \leftarrow x_p v^{-1/3}$, $m \leftarrow y_p v^{-1/2}$ with respect to coordinates of the rational point P $(x_p, y_p)$, by causing the electronic computer to function as a substitution unit;

a step of performing substitution operations $f \leftarrow 1$, $T' \leftarrow Q'$, by causing the electronic computer to function as a substitution unit;

a step of calculating $1_{T,T}(x_p,y_p)v^{-1/2}$ as $1_{T',T'}(n,m)$, instead of calculating $1_{T,T}(x_p,y_p)$ which is a value substituted by coordinates $(x_p,y_p)$ of the rational point P in the left hand side of an equation $1_{T,T}(x,y)=0$ of the tangent line passing through the rational point T, and performing a substitution operation $f \leftarrow f^2 \cdot 1_{T',T'}(n,m)$, by causing the electronic computer to function as a first arithmetic operation unit;

a step of performing a substitution operation $T' \leftarrow 2T'$, by causing the electronic computer to function as a second arithmetic operation unit;

a step of, when a value of the predetermined bit of s in binary representation is 1, calculating $1_{T,Q}(x_p,y_p)v^{-1/2}$ as $1_{T',Q'}(n,m)$, instead of calculating $1_{T,Q}(x_p,y_p)$ which is a value substituted by coordinates of the rational point P in the left hand side of an equation $1_{T,Q}(x,y)=0$ of the straight line passing through the rational points T and Q, and performing a substitution operation $f \leftarrow f \cdot 1_{T',Q'}(n,m)$, by causing the electronic computer to function as a third arithmetic operation unit;

a step of, when a value of the predetermined bit of s in binary representation is 1, performing a substitution operation $T' \leftarrow T'+Q'$, by causing the electronic computer to function as a fourth arithmetic operation unit; and a step of performing an exponentiation operation to the power of $(q^{6h}-1)/r$, by causing the electronic computer to function as a fifth arithmetic operation unit.

According to a ninth aspect of the present invention, there is provided a non-transitory recording medium recording a pairing computation program, wherein an elliptic curve equation is given as $y^2=x^3+ax+b$, $a \in F_q$ $b \in F_q$ (q: a power of a prime number greater than 3), letting an embedding degree be 2h-th degree (h: a natural number), E be an additive group constituted of rational points on a pairing-enabled elliptic curve defined over $F_q^{2h}$, $E[r]$ be a set of rational points of prime order r, and $\phi_q$ be the Frobenius endomorphism, the Ate pairing e is defined, using $$G_1 = E[r] \cap Ker(\phi_q - [1])$$

$$G_2 = E[r] \cap Ker(\phi_q - [q])$$

as a non-degenerate bilinear map $$e: G_2 \times G_1 \rightarrow F_q^{*2h}/(F_q^{*2h})^r,$$

and letting $P \in G_1$, $Q \in G_2$, and letting $s=t-1$ using a trace t of the Frobenius endomorphism $\phi_q$, and using the Miller function $f_{s,Q}(\cdot)$, an electronic computer is caused to compute the Ate pairing $e(Q,P)$ as $$e(Q, P) = f_{s,Q}(P)^{\frac{q^{2h}-1}{r}},\qquad\text{[E22]}$$

the pairing computation program characterized by using $v \in F_q^h$ which is a quadratic non-residue element and becomes 1 by an exponentiation of $f_{s,Q}(P)$ to the power of $(q^{2h}-1)/r$ and a twist curve of $E(F_q^h)$, that is, $E'(F_q^h): y^2 = x^3 + av^{-2}x + bv^{-3}$, and by causing the electronic computer to perform:

a step of receiving inputs of said $s = t-1$, P which satisfies $P \in E(F_q)$, and Q' which satisfies $Q' \in E'(F_q^h)$, by causing the electronic computer to function as an input unit;

a step of performing substitution operations $n \leftarrow x_p v^{-1}$, $m \leftarrow y_p v^{-3/2}$ with respect to coordinates of the rational point P $(x_p, y_p)$, by causing the electronic computer to function as a substitution unit;

a step of performing substitution operations $f \leftarrow 1$, $T' \leftarrow Q'$, by causing the electronic computer to function as a substitution unit;

a step of calculating $l_{T,T}(x_p, y_p) v^{-3/2}$ as $l_{T',T'}(n,m)$, instead of calculating $l_{T,T}(x_p, y_p)$ which is a value substituted by coordinates $(x_p, y_p)$ of the rational point P in the left hand side of an equation $l_{T,T}(x,y)=0$ of the tangent line passing through the rational point T, and performing a substitution operation $f \leftarrow f^2 \cdot l_{T',T'}(n,m)$, by causing the electronic computer to function as a first arithmetic operation unit;

a step of performing a substitution operation $T' \leftarrow 2T'$, by causing the electronic computer to function as a second arithmetic operation unit;

a step of, when a value of the predetermined bit of s in binary representation is 1, calculating $l_{T,Q}(x_p, y_p) v^{-3/2}$ as $l_{T',Q'}(n,m)$, instead of calculating $l_{T,Q}(x_p, y_p)$ which is a value substituted by coordinates of the rational point P in the left hand side of an equation $l_{T,Q}(x,y)=0$ of the straight line passing through the rational points T and Q, and performing a substitution operation $f \leftarrow f \cdot l_{T',Q'}(n,m)$, by causing the electronic computer to function as a third arithmetic operation unit;

a step of, when a value of the predetermined bit of s in binary representation is 1, performing a substitution operation $T' \leftarrow T' + Q'$, by causing the electronic computer to function as a fourth arithmetic operation unit; and a step of performing an exponentiation operation to the power of $(q^{2h}-1)/r$, by causing the electronic computer to function as a fifth arithmetic operation unit.

According to a tenth aspect of the present invention, there is provided a non-transitory recording medium recording a pairing computation program, wherein an elliptic curve equation is given as $y^2 = x^3 + a$, $a \in F_q$ (q: a power of a prime number greater than 3), letting an embedding degree be 3h-th degree (h: a natural number), E be an additive group constituted of rational points on a pairing-enabled elliptic curve defined over $F_q^{3h}$, E[r] be a set of rational points of prime order r, and $\phi_q$ be the Frobenius endomorphism, the Ate pairing e is defined, using $$G_1 = E[r] \cap Ker(\phi_q - [1])$$

$$G_2 = E[r] \cap Ker(\phi_q - [q]),$$

as a non-degenerate bilinear map $$e: G_2 \times G_1 \to F_q^{*3h}/(F_q^{*3h})^r,$$

and letting $P \in G_1$, $Q \in G_2$, and letting $s = t-1$ using a trace t of the Frobenius endomorphism $\phi_q$, and using the Miller function $f_{s,Q}(\bullet)$, an electronic computer is caused to compute the Ate pairing $e(Q,P)$ as $$e(Q, P) = f_{s,Q}(P)^{\frac{q^{3h}-1}{r}},\qquad\text{[E23]}$$

the pairing computation program characterized by using $v \in F_q^h$ which is a quadratic and cubic non-residue element and becomes 1 by an exponentiation of $f_{s,Q}(P)$ to the power of $(q^{3h}-1)/r$ and a twist curve of $E(F_q^h)$, that is, $E'(F_q^h): y^2 = x^3 + av^{-1}$, and by causing the electronic computer to perform:

a step of receiving inputs of said $s = t-1$, P which satisfies $P \in E(F_q)$, and Q' which satisfies $Q' \in E'(F_q^h)$, by causing the electronic computer to function as an input unit;

a step of performing substitution operations $n \leftarrow x_p v^{-1/3}$, $m \leftarrow y_p v^{-1/2}$ with respect to coordinates of the rational point P $(x_p, y_p)$, by causing the electronic computer to function as a substitution unit;

a step of performing substitution operations $f \leftarrow 1$, $T' \leftarrow Q'$, by causing the electronic computer to function as a substitution unit;

a step of calculating $l_{T,T}(x_p, y_p) v^{-1/2}$ as $l_{T',T'}(n,m)$, instead of calculating $l_{T,T}(x_p, y_p)$ which is a value substituted by coordinates $(x_p, y_p)$ of the rational point P in the left hand side of an equation $l_{T,T}(x,y)=0$ of the tangent line passing through the rational point T, and performing a substitution operation $f \leftarrow f^2 \cdot l_{T',T'}(n,m)$, by causing the electronic computer to function as a first arithmetic operation unit;

a step of performing a substitution operation $T' \leftarrow 2T'$, by causing the electronic computer to function as a second arithmetic operation unit;

a step of, when a value of the predetermined bit of s in binary representation is 1, calculating $l_{T,Q}(x_p, y_p) v^{-1/2}$ as $l_{T',Q'}(n,m)$, instead of calculating $l_{T,Q}(x_p, y_p)$ which is a value substituted by coordinates of the rational point P in the left hand side of an equation $l_{T,Q}(x,y)=0$ of the straight line passing through the rational points T and Q, and performing a substitution operation $f \leftarrow f \cdot l_{T',Q'}(n,m)$ by causing the electronic computer to function as a third arithmetic operation unit;

a step of, when a value of the predetermined bit of s in binary representation is 1, performing a substitution operation $T' \leftarrow T' + Q'$, by causing the electronic computer to function as a fourth arithmetic operation unit; and a step of performing an exponentiation operation to the power of $(q^{3h}-1)/r$, by causing the electronic computer to function as a fifth arithmetic operation unit.

According to a eleventh aspect of the present invention, there is provided a non-transitory recording medium recording a pairing computation program, wherein an elliptic curve equation is given as $y^2 = x^3 + ax$, $a \in F_q$ (q: a power of a prime number greater than 3), letting an embedding degree be 4h-th degree (h: a natural number), $q^h - 1$ be dividable by 4, E be an additive group constituted of rational points on a pairing-enabled elliptic curve defined over $F_q^{4h}$, E[r] be a set of rational points of prime order r, and $\phi_q$ be the Frobenius endomorphism, the Ate pairing e is defined, using $$G_1 = E[r] \cap Ker(\phi_q - [1])$$

$$G_2 = E[r] \cap Ker(\phi_q - [q]),$$

as a non-degenerate bilinear map $$e: G_2 \times G_1 \to F_q^{*4h}/(F_q^{*4h})^r,$$

and letting $P \in G_1$, $Q \in G_2$, and letting $s = t-1$ using a trace t of the Frobenius endomorphism $\phi_q$, and using the Miller function $f_{s,Q}(\bullet)$, an electronic computer is caused to compute the Ate pairing $e(Q,P)$ as $$e(Q, P) = f_{s,Q}(P)^{\frac{q^{4h}-1}{r}}, \quad \text{[E24]}$$

the pairing computation program characterized by using $v \in F_q^h$ which is a quadratic non-residue element and becomes 1 by an exponentiation of $f_{s,Q}(P)$ to the power of $(q^{4h}-1)/r$ and a twist curve of $E(F_q^h)$, that is, $E'(F_q^h):y^2=x^3+av^{-1}x$, and by causing the electronic computer to perform:

a step of receiving inputs of said $s=t-1$, P which satisfies $P \in E(F_q)$, and Q' which satisfies $Q' \in E'(F_q^h)$, by causing the electronic computer to function as an input unit;

a step of performing substitution operations $n \leftarrow x_p v^{-1/2}$, $m \leftarrow y_p v^{-3/4}$ with respect to coordinates of the rational point P $(x_p, y_p)$, by causing the electronic computer to function as a substitution unit;

a step of performing substitution operations $f \leftarrow 1$, $T' \leftarrow Q'$, by causing the electronic computer to function as a substitution unit;

a step of calculating $1_{T,T}(x_p, y_p)v^{-3/4}$ as $1_{T',T'}(n,m)$, instead of calculating $1_{T,T}(x_p, y_p)$ which is a value substituted by coordinates $(x_p, y_p)$ of the rational point P in the left hand side of an equation $1_{T,T}(x,y)=0$ of the tangent line passing through the rational point T, and performing a substitution operation $f \leftarrow f^2 \cdot 1_{T',T'}(n,m)$, by causing the electronic computer to function as a first arithmetic operation unit;

a step of performing a substitution operation $T' \leftarrow 2T'$, by causing the electronic computer to function as a second arithmetic operation unit;

a step of, when a value of the predetermined bit of s in binary representation is 1, calculating $1_{T,Q}(x_p, y_p)v^{-3/4}$ as $1_{T',Q'}(n,m)$, instead of calculating $1_{T,Q}(x_p, y_p)$ which is a value substituted by coordinates of the rational point P in the left hand side of an equation $1_{T,Q}(x,y)=0$ of the straight line passing through the rational points T and Q, and performing a substitution operation $f \leftarrow f \cdot 1_{T',Q'}(n,m)$, by causing the electronic computer to function as a third arithmetic operation unit;

a step of, when a value of the predetermined bit of s in binary representation is 1, performing a substitution operation $T' \leftarrow T'+Q'$, by causing the electronic computer to function as a fourth arithmetic operation unit; and a step of performing an exponentiation operation to the power of $(q^{4h}-1)/r$, by causing the electronic computer to function as a fifth arithmetic operation unit.

According to a twelfth aspect of the present invention, there is provided a non-transitory recording medium recording a pairing computation program, wherein an elliptic curve equation is given as $y^2=x^3+a$, $a \in F_q$ (q: a power of a prime number greater than 3), letting an embedding degree be 6h-th degree (h: a natural number), E be an additive group constituted of rational points on a pairing-enabled elliptic curve defined over $F_q^{6h}$, E[r] be a set of rational points of prime order r, and $\phi_q$ be the Frobenius endomorphism, the Ate pairing e is defined, using $G_1 = E[r] \cap Ker(\phi_q - [1])$ $G_2 = E[r] \cap Ker(\phi_q - [q])$, as a non-degenerate bilinear map
$e: G_2 \times G_1 \rightarrow F^*{}_q^{6h}/(F^*{}_q^{6h})^r$,
and letting $P \in G_1$, $Q \in G_2$, and letting $s=t-1$ using a trace t of the Frobenius endomorphism $\phi_q$, and using the Miller function $f_{s,Q}(\cdot)$, an electronic computer is caused to compute the Ate pairing $e(Q,P)$ as $$e(Q, P) = F_{s,Q}(P)^{\frac{q^{6h}-1}{r}}, \quad \text{[E25]}$$

the pairing computation program characterized by using $v \in F_q^h$ which is a quadratic and cubic non-residue element and becomes 1 by an exponentiation of $f_{s,Q}(P)$ to the power of $(q^{6h}-1)/r$ and a twist curve of $E(F_q^h)$, that is, $E'(F_q^h):y^2=x^3+av^{-1}$, and by causing the electronic computer to perform:

a step of receiving inputs of said $s=t-1$, P which satisfies $P \in E(F_q)$, and Q' which satisfies $Q' \in E'(F_q^h)$, by causing the electronic computer to function as an input unit;

a step of performing substitution operations $n \leftarrow x_p v^{-1/3}$, $m \leftarrow y_p v^{-1/2}$ with respect to coordinates of the rational point P $(x_p, y_p)$, by causing the electronic computer to function as a substitution unit;

a step of performing substitution operations $f \leftarrow 1$, $T' \leftarrow Q'$, by causing the electronic computer to function as a substitution unit;

a step of calculating $1_{T,T}(x_p, y_p)v^{-1/2}$ as $1_{T',T'}(n,m)$, instead of calculating $1_{T,T}(x_p, y_p)$ which is a value substituted by coordinates $(x_p, y_p)$ of the rational point P in the left hand side of an equation $1_{T,T}(x,y)=0$ of the tangent line passing through the rational point T, and performing a substitution operation $f \leftarrow f^2 \cdot 1_{T',T'}(n,m)$, by causing the electronic computer to function as a first arithmetic operation unit;

a step of performing a substitution operation $T' \leftarrow 2T'$, by causing the electronic computer to function as a second arithmetic operation unit;

a step of, when a value of the predetermined bit of s in binary representation is 1, calculating $1_{T,Q}(x_p, y_p)v^{-1/2}$ as $1_{T',Q'}(n,m)$, instead of calculating $1_{T,Q}(x_p, y_p)$ which is a value substituted by coordinates of the rational point P in the left hand side of an equation $1_{T,Q}(x,y)=0$ of the straight line passing through the rational points T and Q, and performing a substitution operation $f \leftarrow f \cdot 1_{T',Q'}(n,m)$, by causing the electronic computer to function as a third arithmetic operation unit;

a step of, when a value of the predetermined bit of s in binary representation is 1, performing a substitution operation $T' \leftarrow T'+Q'$, by causing the electronic computer to function as a fourth arithmetic operation unit; and a step of performing an exponentiation operation to the power of $(q^{6h}-1)/r$, by causing the electronic computer to function as a fifth arithmetic operation unit.

The present invention, in performing pairing computation, reduces a burden of arithmetic operations by performing arithmetic operations of a rational function which is required to derive $f_{s,Q}(P)$ on the lower degree proper subfield using a twist curve, thus enabling to speedup the pairing computation.

BRIEF DESCRIPTION OF THE DRAWINGS

FIG. 1 is an explanatory view of conventional Miller's algorithm;

FIG. 2 is an explanatory view of Miller's algorithm according to the present invention;

Figure 3:
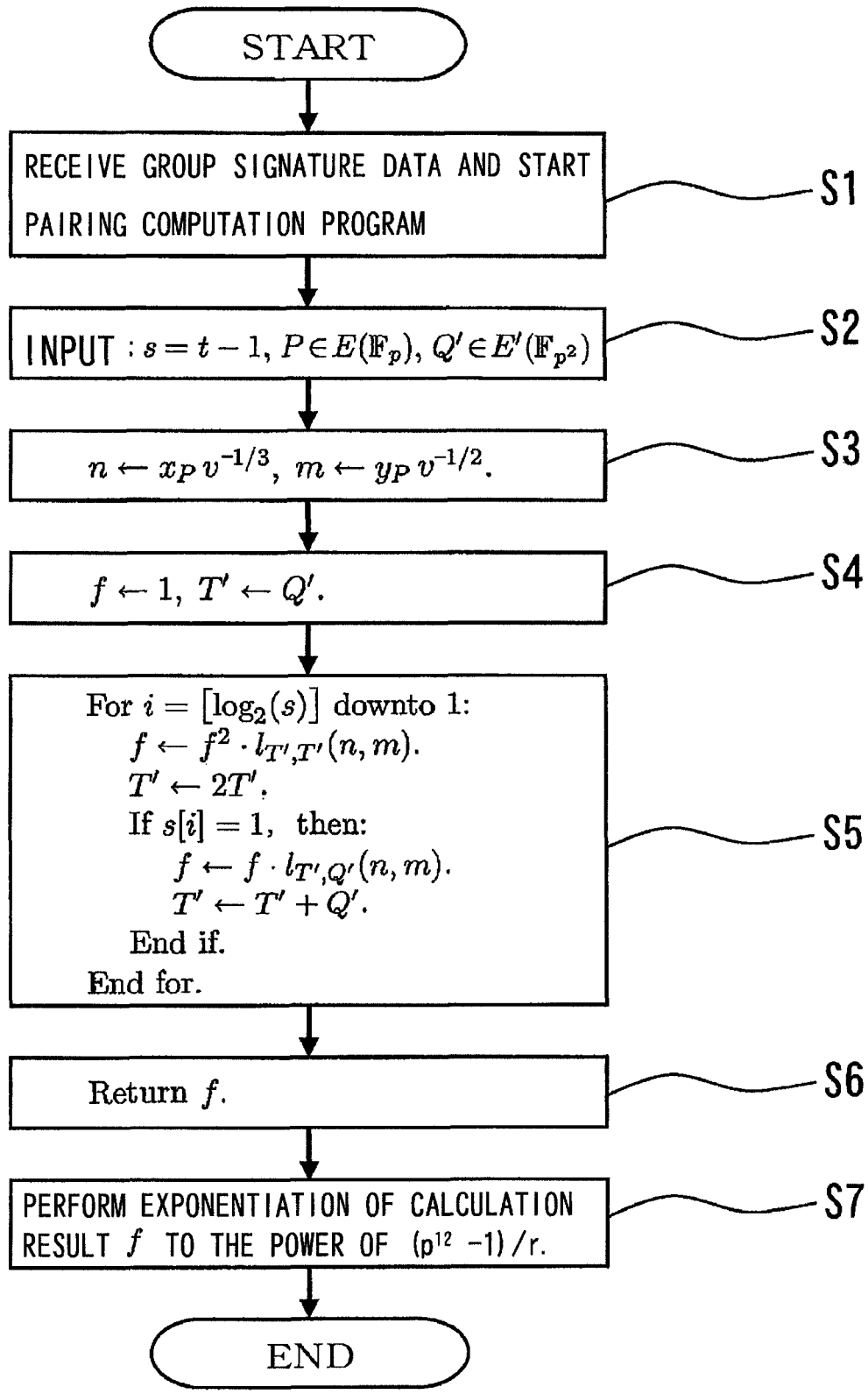
FIG. 3 is a flowchart of a pairing computation program according to the present invention.

EXPLANATION OF SYMBOLS 10 electronic computer
11 CPU 12 storage unit
13 memory unit
14 bus
15 input output control part
20 telecommunication lines
30 client device

DESCRIPTION OF THE PREFERRED EMBODIMENTS

A paring computation device, a pairing computation method, and a pairing computation program according to the present invention make possible high speed computation by speeding up an arithmetic operation using Miller's algorithm in a paring computation which is constituted of a step of performing an arithmetic operation using Miller's algorithm and a step of performing the final exponentiation operation.

The Miller's algorithm is known as an algorithm shown in FIG. 1. Supposing an elliptic curve equation is given as $y^2=x^3+ax+b$, $a \in F_q$, $b \in F_q$ (q: a power of a prime number greater than 3), letting an embedding degree be 2h-th degree (h: a natural number), E be an additive group constituted of rational points on a pairing-enabled elliptic curve defined over $F_q^{2h}$, E[r] be a set of rational points of prime order r, $\phi_q$ be the Frobenius endomorphism, the Miller's algorithm inputs s=t−1 using a trace t of the Frobenius endomorphism $\phi_q$, P which satisfies P∈E($F_q$), and Q which satisfies Q∈E ($F_q^{2h}$), and outputs $f_{s,Q}(P)$.

In addition, an embedding degree is not limited to even degree. In the case where the embedding degree is a multiple of 3, it is desirable that an elliptic curve equation is given as $y^2=x^3+a$, $a \in F_q$ (q: a power of a prime number greater than 3), an embedding degree is 3h-th degree (h: a natural number), and an additive group consisting of rational points on a pairing-enabled elliptic curve defined over $F_q^{3h}$ is used.

Further, particularly in the case where the embedding degree is a multiple of 4, it is desirable that an elliptic curve equation is given as $y^2=x^3+ax$, $a \in F_q$ (q: a power of a prime number greater than 3), an embedding degree is 4h-th degree (h: a natural number), 4 divides $q^h-1$, and additive group consisting of rational points on a pairing-enabled elliptic curve defined over $F_q^{4h}$ is used.

Still further, particularly in the case where the embedding degree is a multiple of 6, it is desirable that an elliptic curve equation is given as $y^2=x^3+a$, $a \in F_q$ (q: a power of a prime number greater than 3), an embedding degree is 6h-th degree (h: a natural number), and an additive group consisting of rational points on a pairing-enabled elliptic curve defined over $F_q^{6h}$ is used.

In the first step of the Miller's algorithm shown in FIG. 1, substitution operations f←1, T←Q are performed and the following arithmetic operations are iterated based on a condition of iteration in the second step. In the second step, to be more specific, the number of bits obtained by binary representation of s is set as an initial value of i, an iteration count is controlled by decrementing i by 1 for each iteration of arithmetic operations. s[i] in the fifth step denotes a value of the i-th bit from the least bit of s in binary representation, and s[i] is any one of "0" and "1".

In the third step of the Miller's algorithm shown in FIG. 1, an arithmetic operation of a value of $l_{T,T}(x_p,y_p)$ substituted by coordinates of rational point P in the left hand side of $l_{T,T}(x,y)=0$ which is the tangent line passing through rational point T is performed. In the fourth step, an elliptic curve doubling is performed as T←2T.

In the fifth step of the Miller's algorithm shown in FIG. 1, it is determined whether or not a bit value of s[i] in the case of binary representation of s is 1, and in the case of 1, in the sixth step, an arithmetic operation of a value of $l_{T,Q}(x_p,y_p)$ substituted by coordinates of rational point P in the left hand side of $l_{T,Q}(x,y)=0$ which is the straight line passing through rational points T and Q is performed. In the seventh step, an elliptic curve addition is performed as T←T+Q.

In the tenth step of the Miller's algorithm shown in FIG. 1, arithmetic operations are iterated based on the condition of iteration in the second step, and a result of the arithmetic operations is outputted. In pairing computation, finally, an exponentiation operation to the power of $(q^{2h}-1)/r$ is performed with respect to $f_{s,Q}(P)$ which is a result of arithmetic operations outputted from the Miller's algorithm.

In addition, in the case of the embedding degree being a multiple of 3, the final exponentiation is to the power of $(q^{3h}-1)/r$, in the case of the embedding degree being a multiple of 4, the final exponentiation is to the power of $(q^{4h}-1)/r$, and in the case of the embedding degree being a multiple of 6, the final exponentiation is to the power of $(q^{6h}-1)/r$.

In what follows, arithmetic operation methods of $l_{T,T}(x_p,y_p)$ in the third step and $l_{T,Q}(x_p,y_p)$ in the fifth step are explained. Here, let the embedding degree be even degree, that is, 2h-th degree (h: a natural number) and the elliptic curve be $y^2=x^3+ax+b$, $a \in F_q$, $b \in F_q$ (q: a power of a prime number greater than 3).

Letting T=($x_T$, $y_T$), and Q=($x_Q$, $y_Q$), $\lambda_{T,T}$ which is the gradient of $l_{T,T}(x_p,y_p)$ and $\lambda_{T,Q}$ which is the gradient of $l_{T,Q}(x_p,y_p)$ are given by the following equation.

$$\lambda_{T,T} = \frac{3x_T^2 + a}{2y_T} \qquad [E26]$$

$$\lambda_{T,Q} = \frac{y_Q - y_T}{x_Q - x_T} \qquad [E27]$$

$$(T \neq Q)$$

A value of $l_{T,Q}(x_p,y_p)$ is calculated as follows using this gradient $\lambda_{T,Q}$.

$$\lambda_{T,Q}(x_p,y_p) = (x_p - x_T)\lambda_{T,Q} - (y_p - y_T) \qquad [E28]$$

Although, usually, the calculation is performed on $E(F_q^{2h})$ using [E26] and [E27], in the case where the embedding degree is an even degree, that is, 2h-th degree (h: a natural number) and the elliptic curve is given as $y^2=x^3+ax+b$, $a \in F_q$, $b \in F_q$ (q: a power of a prime number greater than 3), there exists a twist curve of $E(F_q^h)$, that is $E'(F_q^h): y^2=x^3+av^{-2}x+bv^{-3}$, $v \in F_q^h$, and there exists a homomorphism from $E'(F_q^h)$ to $E(F_q^{2h})$, that is, $(x,y) \rightarrow (xv, yv^{3/2})$. Here, a new parameter v is a quadratic non-residue element which becomes 1 by an exponentiation of itself to the power of $(q^{2h}-1)/r$.

Therefore, it is possible to perform the elliptic curve addition on $E(F_q^{2h})[r]$ substituting the elliptic curve addition on $E'(F_q^h)[r]$ which has a ½ extension degree, thus enabling to reduce a burden of arithmetic operations and to perform high speed computation.

In particular, since there exist rational points T',Q' on $E'(F_q^h)$ where relations T=($x_T$, $y_T$)=($x_T \cdot v$, $y_T \cdot v^{3/2}$), Q=($x_Q$, $y_Q$)=($x_Q \cdot v$, $y_Q \cdot v^{3/2}$) hold with respect to rational points T,Q∈E ($F_q^{2h}$), first, $\lambda_{T,T}$, the gradient of $l_{T,T}(x,y)$ and $\lambda_{T,Q}$, the gradient of $l_{T,Q}(x_p,y_p)$ are transformed as follows.

$$\lambda_{T,T} = \frac{3x_T^2 + a}{2y_T} = \frac{(3x_T'^2 + av^{-2})v^2}{2y_T' v^{\frac{3}{2}}} = \lambda_{T',T'} v^{\frac{1}{2}} \quad [E29]$$

$$\lambda_{T,Q} = \frac{y_Q - y_T}{x_Q - x_T} = \frac{(y_Q' - y_T')v^{\frac{3}{2}}}{(x_Q' - x_T')v} = \lambda_{T',Q'} v^{\frac{1}{2}} \quad [E30]$$

$(T \neq Q)$

The gradient $\lambda_{T,Q}$ becomes as follows from [E29] and [E30], irrespective of T=Q, T≠Q.

$$\lambda_{T,Q} = \lambda_{T',Q'} v^{\frac{1}{2}} \quad [E31]$$

Therefore, from [E31], the equation [E28] becomes as follows.

$$\begin{aligned} l_{T,Q}(x_P, y_P) &= (x_P - x_T)\lambda_{T,Q} - (y_P - y_T) \quad [E32] \\ &= (x_P - x_{T'}v)\lambda_{T',Q'} v^{\frac{1}{2}} - \left(y_P - y_{T'}v^{\frac{3}{2}}\right) \\ &= \left((x_P v^{-1} - x_{T'})\lambda_{T',Q'} - \left(y_P v^{-\frac{3}{2}} - y_{T'}\right)\right)v^{\frac{3}{2}} \\ &= l_{T',Q'}\left(x_P v^{-1}, y_P v^{-\frac{3}{2}}\right)v^{\frac{3}{2}} \end{aligned}$$

Since the final part of $v^{3/2}$ in the equation [E32] becomes 1 at the final exponentiation to the power of $(q^{2h}-1)/r$ in the pairing computation, in calculating the $l_{T,Q}(x_p,y_p)$ in the Miller's algorithm, it is enough to calculate $l_{T',Q'}(x_p v^{-1}, y_p v^{-3/2})$ on the proper subfield instead of calculating $l_{T,Q}(x_p,y_p)$, thus enabling to reduce a burden of arithmetic operations significantly.

That is, the elliptic curve equation is given as $y^2=x^3+ax+b$, $a \in F_q$, $b \in F_q$ (q: a power of a prime number greater than 3), letting the embedding degree be 2h-th degree (h: a natural number), E be an additive group constituted of rational points on the pairing-enabled elliptic curve defined over $F_q^{2h}$, E[r] be a set of rational points of prime order r, $\phi_q$ be the Frobenius endomorphism, and using $G_1 = E[r] \cap Ker(\phi_q - [1])$ $G_2 = E[r] \cap Ker(\phi_q - [q])$ the Ate pairing e is defined as a non-degenerate bilinear map, e: $G_2 \times G_1 \rightarrow F_q^{*2h}/(F_q^{*2h})^r$, and letting $P \in G_1$, $Q \in G_2$, and letting s=t-1 using a trace t of the Frobenius endomorphism $\phi_q$, and using Miller function $f_{s,Q}(\bullet)$, in computing the Ate pairing e(Q,P) as $$e(Q, P) = F_{s,Q}(P)^{\frac{q^{2h}-1}{r}} \quad [E33]$$

the arithmetic operations of the rational function $l_{T,T}(x_p,y_p)$ and $l_{T,Q}(x_p,y_p)$ which are required to derive $f_{s,Q}(P)$ are performed on the proper subfield by a twist curve of $E(F_q^h)$, that is, $E'(F_q^h):y^2=x^3+av^{-2}x+bv^{-3}$, using $v \in F_q^h$ which is a quadratic non-residue element and becomes 1 by an exponentiation of $f_{s,Q}(P)$ to the power of $(q^{2h}-1)/r$, as arithmetic operations $l_{T',T'}(x_p v^{-1}, y_p v^{-3/2})$ and $l_{T',Q'}(x_p v^{-1}, y_p v^{-3/2})$, and hence, it is possible to reduce a burden of arithmetic operations and to perform high speed computation.

In the case where the embedding degree is a multiple of 3, that is, 3h-th degree (h: a natural number) and the elliptic curve is given as $y^2=x^3+a$, $a \in F_q$ (q: a power of a prime number greater than 3), there exists a twist curve of $E(F_q^h)$, that is $E'(F_q^h):y^2=x^3+av^{-1}$, $v \in F_q^h$, and there exists a homomorphism from $E'(F_q^h)$ to $E(F_q^{3h})$, that is, $(x,y) \rightarrow (xv^{1/3}, yv^{1/2})$. Here, a new parameter v is a quadratic and cubic non-residue element which becomes 1 by an exponentiation of itself to the power of $(q^{3h}-1)/r$.

Therefore, it is possible to perform the elliptic curve addition on $E(F_q^{3h})[r]$ substituting the elliptic curve addition on $E'(F_q^h)[r]$ which has a ⅓ extension degree, thus enabling to reduce a burden of arithmetic operations and to perform high speed computation.

In particular, since there exist rational points T',Q' on $E'(F_q^h)$ where relations $T=(x_T, y_T)=(x_{T'}v^{1/3}, y_{T'}v^{1/2})$, $Q=(x_Q, y_Q)=(x_{Q'}v^{1/3}, y_{Q'}v^{1/2})$ hold with respect to rational points $T,Q \in E(F_q^{3h})$, first, $\lambda_{T,T}$, the gradient of $l_{T,T}(x,y)$ and $\lambda_{T,Q}$, the gradient of $l_{T,Q}(x_p,y_p)$ are transformed as follows.

$$\lambda_{T,T} = \frac{3x_T^2}{2y_T} = \frac{3x_{T'}^2 v^{\frac{2}{3}}}{2y_{T'} v^{\frac{1}{2}}} = \lambda_{T',T'} v^{\frac{1}{6}} \quad [E34]$$

$$\lambda_{T,Q} = \frac{y_Q - y_T}{x_Q - x_T} = \frac{(y_Q' - y_T')v^{\frac{1}{2}}}{(x_Q' - x_T')v^{\frac{1}{3}}} = \lambda_{T',Q'} v^{\frac{1}{6}} \quad [E35]$$

$(T \neq Q)$

The gradient $\lambda_{T,Q}$ becomes as follows from [E34] and [E35], irrespective of T=Q, T≠Q.

$$\lambda_{T,Q} = \lambda_{T',Q'} v^{\frac{1}{6}} \quad [E36]$$

Therefore, from [E36], the equation [E28] becomes as follows.

$$\begin{aligned} l_{T,Q}(x_P, y_P) &= (x_P - x_T)\lambda_{T,Q} - (y_P - y_T) \quad [E37] \\ &= (x_P - x_{T'}v^{\frac{1}{3}})\lambda_{T',Q'} v^{\frac{1}{6}} - \left(y_P - y_{T'}v^{\frac{1}{2}}\right) \\ &= \left((x_P v^{-\frac{1}{3}} - x_{T'})\lambda_{T',Q'} - \left(y_P v^{-\frac{1}{2}} - y_{T'}\right)\right)v^{\frac{1}{2}} \\ &= l_{T',Q'}\left(x_P v^{-\frac{1}{3}}, y_P v^{-\frac{1}{2}}\right)v^{\frac{1}{2}} \end{aligned}$$

Since the final part of $v^{1/2}$ in the equation [E37] becomes 1 at the final exponentiation to the power of $(q^{3h}-1)/r$ in the pairing computation, in calculating the $l_{T,Q}(x_p,y_p)$ in the Miller's algorithm, it is enough to calculate $l_{T',Q'}(x_p v^{-1/3}, y_p v^{-1/2})$ on the proper subfield instead of calculating $l_{T,Q}(x_p,y_p)$, thus enabling to reduce a burden of arithmetic operations significantly.

That is, the elliptic curve equation is given as $y^2=x^3+a$, $a \in F_q$, (q: a power of a prime number greater than 3), letting the embedding degree be 3h-th degree (h: a natural number), E be an additive group constituted of rational points on the pairing-enabled elliptic curve defined over $F_q^{3h}$, E[r] be a set of rational points of prime order r, $\phi_q$ be the Frobenius endomorphism, and using $G_1 = E[r] \cap Ker(\phi_q - [1])$ $G_2 = E[r] \cap Ker(\phi_q - [q])1$ the Ate pairing e is defined as a non-degenerate bilinear map, e: $G_2 \times G_1 \rightarrow F^{*}_{q}{}^{3h}/(F^{*}_{q}{}^{3h})^r$, and letting $P \in G_1$, $Q \in G_2$, and letting $s = t - 1$ using a trace t of the Frobenius endomorphism $\phi_q$, and using the Miller function $f_{s,Q}(\bullet)$, in computing the Ate pairing e(Q,P) as $$e(Q, P) = F_{s,Q}(P)^{\frac{q^{3h}-1}{r}} \quad [E38]$$

the arithmetic operations of the rational function $l_{T,T}(x_p, y_p)$ and $l_{T,Q}(x_p, y_p)$ which are required to derive $f_{s,Q}(P)$ are performed on the proper subfield by a twist curve of $E(F_q{}^h)$, that is, $E'(F_q{}^h): y^2 = x^3 + av^{-1}$, using $v \in F_q{}^h$ which is a quadratic and cubic non-residue element and becomes 1 by an exponentiation of $f_{s,Q}(P)$ to the power of $(q^{3h}-1)/r$, as arithmetic operations $l_{T',T'}(x_p v^{-1/3}, y_p v^{-1/2})$ and $l_{T',Q'}(x_p v^{-1/3}, y_p v^{-1/2})$ and hence, it is possible to reduce a burden of arithmetic operations and to perform high speed computation.

In the case where the embedding degree is a multiple of 4, that is, 4h-th degree (h: a natural number) and the elliptic curve is given as $y^2 = x^3 + ax$, $a \in F_q$, 4 divides $q^h - 1$ (q: a power of a prime number greater than 3), there exists a twist curve of $E(F_q{}^h)$, that is $E'(F_q{}^h): y^2 = x^3 + av^{-1}x$, $v \in F_q{}^h$, and there exists a homomorphism from $E'(F_q{}^h)$ to $E(F_q{}^{4h})$, that is, $(x,y) \rightarrow (xv^{1/2}, yv^{3/4})$. Here, a new parameter v is a quadratic non-residue element which becomes 1 by an exponentiation of itself to the power of $(q^{4h}-1)/r$.

Therefore, it is possible to perform the elliptic curve addition on $E(F_q{}^{4h})[r]$ substituting the elliptic curve addition on $E'(F_q{}^h)[r]$ which has a ¼ extension degree, thus enabling to reduce a burden of arithmetic operations and to perform high speed computation.

In particular, since there exist rational points T',Q' on $E'(F_q{}^h)$ where relations $T = (x_T, y_T) = (x_{T'} v^{1/2}, y_{T'} v^{3/4})$, $Q = (x_Q, y_Q) = (x_{Q'} v^{1/2}, y_{Q'} v^{3/4})$ hold with respect to rational points $T, Q \in E(F_q{}^{4h})$, first, $\lambda_{T,T}$, the gradient of $l_{T,T}(x,y)$ and $\lambda_{T,Q}$, the gradient of $l_{T,Q}(x_p, y_p)$ are transformed as follows.

$$\lambda_{T,T} = \frac{3x_T^2 + a}{2y_T} = \frac{(3x'_T{}^2 + av^{-1})v}{2y'_T v^{\frac{3}{4}}} = \lambda_{T',T'} v^{\frac{1}{4}} \quad [E39]$$

$$\lambda_{T,Q} = \frac{y_Q - y_T}{x_Q - x_T} = \frac{(y'_Q - y'_T) v^{\frac{3}{4}}}{(x'_Q - x'_T) v^{\frac{1}{2}}} = \lambda_{T',Q'} v^{\frac{1}{4}} \quad [E40]$$

$(T \neq Q)$

The gradient $\lambda_{T,Q}$ becomes as follows from [E39] and [E40], irrespective of T=Q, T≠Q.

$$\lambda_{T,Q} = \lambda_{T',Q'} v^{\frac{1}{4}} \quad [E41]$$

Therefore, from [E41], the equation [E28] becomes as follows.

$$l_{T,Q}(x_P, y_P) = (x_P - x_T)\lambda_{T,Q} - (y_P - y_T) \quad [E42]$$

$$= (x_P - x_{T'} v^{\frac{1}{2}})\lambda_{T',Q'} v^{\frac{1}{4}} - (y_P - y_{T'} v^{\frac{3}{4}})$$

$$= ((x_P v^{-\frac{1}{2}} - x_{T'})\lambda_{T',Q'} - (y_P v^{-\frac{3}{4}} - y'_{T'}))v^{\frac{3}{4}}$$

$$= l_{T',Q'}(x_P v^{-\frac{1}{2}}, y_P v^{-\frac{3}{4}})v^{\frac{3}{4}}$$

Since the final part of $v^{3/4}$ in the equation [E42] becomes 1 at the final exponentiation to the power of $(q^{4h}-1)/r$ in the pairing computation, in calculating the $l_{T,Q}(x_p, y_p)$ in the Miller's algorithm, it is enough to calculate $l_{T',Q'}(x_p v^{-1/2}, y_p v^{-3/4})$, on the proper subfield instead of calculating $l_{T,Q}(x_p, y_p)$, thus enabling to reduce a burden of arithmetic operations significantly.

That is, the elliptic curve equation is given as $y^2 = x^3 + ax$, $a \in F_q$, (q: a power of a prime number greater than 3), letting the embedding degree be 4h-th degree, $q^h - 1$ be dividable by 4 (h: a natural number), E be an additive group constituted of rational points on the pairing-enabled elliptic curve defined over $F_q{}^{4h}$, E[r] be a set of rational points of prime order r, $\phi_q$ be the Frobenius endomorphism, and using $G_1 = E[r] \cap Ker(\phi_q - [1])$ $G_2 = E[r] \cap Ker(\phi_q - [q])$ the Ate pairing e is defined as a non-degenerate bilinear map, e: $G_2 \times G_1 \rightarrow F^{*}_{q}{}^{4h}/(F^{*}_{q}{}^{4h})^r$, and letting $P \in G_1$, $Q \in G_2$, and letting $s = t - 1$ using a trace t of the Frobenius endomorphism $\phi_q$, and using the Miller function $f_{s,Q}(\bullet)$, in computing the Ate pairing e(Q,P) as $$e(Q, P) = F_{s,Q}(P)^{\frac{q^{4h}-1}{r}} \quad [E43]$$

the arithmetic operations of the rational function $l_{T,T}(x_p, y_p)$ and $l_{T,Q}(x_p, y_p)$ which are required to derive $f_{s,Q}(P)$ are performed on the proper subfield by a twist curve of $E(F_q{}^h)$, that is, $E'(F_q{}^h): y^2 = x^3 + av^{-1}x$, using $v \in F_q{}^h$ which is a quadratic non-residue element and becomes 1 by an exponentiation of $f_{s,Q}(P)$ to the power of $(q^{4h}-1)/r$, as arithmetic operations $l_{T',T'}(x_p v^{-1/2}, y_p v^{-3/4})$ and $l_{T',Q'}(x_p v^{-1/2}, y_p v^{-3/4})$, and hence, it is possible to reduce a burden of arithmetic operations and to perform high speed computation.

In the case where the embedding degree is a multiple of 6, that is, 6h-th degree (h: a natural number) and the elliptic curve is given as $y^2 = x^3 + a$, $a \in F_q$ (q: a power of a prime number greater than 3), there exists a twist curve of $E(F_q{}^h)$, that is, $E'(F_q{}^h): y^2 = x^3 + av^{-1}$, $v \in F_q{}^h$, and there exists a homomorphism from $E'(F_q{}^h)$ to $E(F_q{}^{6h})$, that is, $(x,y) \rightarrow (xv^{1/3}, yv^{1/2})$. Here, a new parameter v is a quadratic and cubic non-residue element which becomes 1 by an exponentiation of itself to the power of $(q^{6h}-1)/r$.

Therefore, it is possible to perform the elliptic curve addition on $E(F_q{}^{6h})[r]$ substituting the elliptic curve addition on $E'(F_q{}^h)[r]$ which has a ⅙ extension degree thus enabling to reduce a burden of arithmetic operations and to perform high speed computation.

In particular, since there exist rational points T',Q' on $E'(F_q{}^h)$ where relations $T = (x_T, y_T) = (x_{T'} v^{1/3}, y_{T'} v^{1/2})$, $Q = (x_Q, y_Q) = (x_{Q'} v^{1/3}, y_{Q'} v^{1/2})$ hold with respect to rational points $T, Q \in E(F_q{}^{6h})$, first, $\lambda_{T,T}$, the gradient of $l_{T,T}(x,y)$ and $\lambda_{T,Q}$, the gradient of $l_{T,Q}(x_p, y_p)$ are transformed as follows.

$$\lambda_{T,T} = \frac{3x_T^2}{2y_T} = \frac{3x'_T{}^2 v^{\frac{2}{3}}}{2y'_T v^{\frac{1}{2}}} = \lambda_{T',T'} v^{\frac{1}{6}} \quad [E44]$$

-continued $$\lambda_{T,Q} = \frac{y_Q - y_T}{x_Q - x_T} = \frac{(y'_Q - y'_T)v^{\frac{1}{2}}}{(x'_Q - x'_T)v^{\frac{1}{3}}} = \lambda_{T',Q'} v^{\frac{1}{6}}$$ [E45]

$(T \neq Q)$

The gradient $\lambda_{T,Q}$ becomes as follows from [E44] and [E45], irrespective of T=Q, T≠Q.

$$\lambda_{T,Q} = \lambda_{T',Q'} v^{\frac{1}{6}}$$ [E46]

Therefore, from [E46], the equation [E28] becomes as follows.

$$l_{T,Q}(x_P, y_P) = (x_P - x_T)\lambda_{T,Q} - (y_P - y_T)$$ [E47]

$$= \left(x_P - x_{T'} v^{\frac{1}{3}}\right)\lambda_{T',Q'} v^{\frac{1}{6}} - \left(y_P - y_{T'} v^{\frac{1}{2}}\right)$$

$$= \left(\left(x_P v^{-\frac{1}{3}} - x_{T'}\right)\lambda_{T',Q'} - \left(y_P v^{-\frac{1}{2}} - y'_T\right)\right)v^{\frac{1}{2}}$$

$$= l_{T',Q'}\left(x_P v^{-\frac{1}{3}}, y_P v^{-\frac{1}{2}}\right)v^{\frac{1}{2}}$$

Since the final part of $v^{1/2}$ in the equation [E47] becomes 1 at the final exponentiation to the power of $(q^{6h}-1)/r$ in the pairing computation, in calculating the $l_{T,Q}(x_p, y_p)$ in the Miller's algorithm, it is enough to calculate $l_{T',Q'}(x_p v^{-1/3}, y_p v^{-1/2})$ on the proper subfield instead of calculating $l_{T,Q}(x_p, y_p)$, thus enabling to reduce a burden of arithmetic operations significantly.

That is, the elliptic curve equation is given as $y^2=x^3+a$, $a \in F_q$ (q: a power of a prime number greater than 3), letting the embedding degree be 6h-th degree (h: a natural number), E be an additive group constituted of rational points on the pairing-enabled elliptic curve defined over $F_q^{6h}$, E[r] be a set of rational points of prime order r, $\phi_q$ be the Frobenius endomorphism, and using $G_1 = E[r] \cap Ker(\phi_q - [1])$ $G_2 = E[r] \cap Ker(\phi_q - [q])$ the Ate pairing e is defined as a non-degenerate bilinear map, e: $G_2 \times G_1 \rightarrow F_q^{*6h}/(F_q^{*6h})^r$, and letting $P \in G_1$, $Q \in G_2$, and letting s=t-1 using a trace t of the Frobenius endomorphism $\phi_q$, and using Miller function $f_{s,Q}(\cdot)$, in computing the Ate pairing e(Q,P) as $$e(Q, P) = f_{s,Q}(P)^{\frac{q^{6h}-1}{r}}$$ [E48]

the arithmetic operations of the rational function $l_{T,T}(x_p, y_p)$ and $l_{T,Q}(x_p, y_p)$ which are required to derive $f_{s,Q}(P)$ are performed on the proper subfield by a twist curve of $E(F_q^h)$, that is, $E'(F_q^h):y^2=x^3+av^{-1}$, using $v \in F_q^h$ which is a quadratic and cubic non-residue element and becomes 1 by an exponentiation of $f_{s,Q}(P)$ to the power of $(q^{6h}-1)/r$, as arithmetic operations $l_{T',T'}(x_p v^{-1/3}, y_p v^{-1/2})$ and $l_{T',Q'}(x_p v^{-1/3}, y_p v^{-1/2})$, and hence, it is possible to reduce a burden of arithmetic operations and to perform high speed computation.

In what follows, a pairing computation program in the case of extension degree of 12 which is the least common multiple of even degree, a degree of a multiple of 3, a degree of a multiple of 4, and a degree of a multiple of 6 is explained. FIG. 2 is Miller's algorithm corresponding to FIG. 1. Here, q, which has been a power of a prime number greater than 3, is assumed to be a prime number P.

In a pairing computation device constituted of an electronic computer, such as an authentication server or the like, a pairing computation is performed by a program based on a flowchart shown in FIG. 3, thus realizing a large scale digital group signature.

Figure 4:
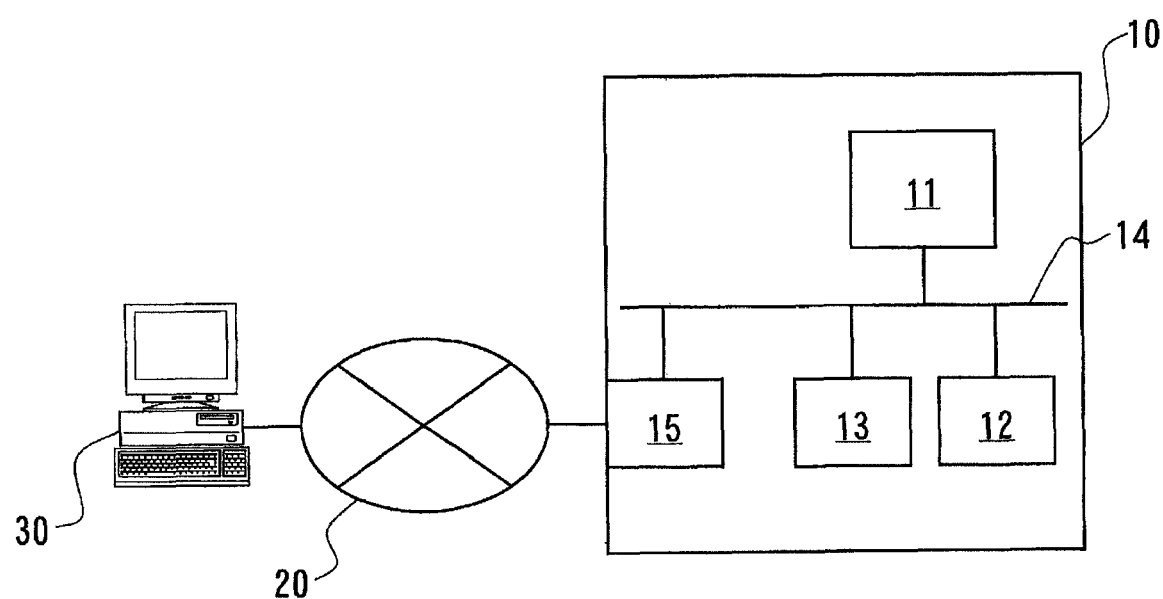
FIG. 4 is a block diagram of a pairing computation device according to an embodiment of the present invention.

Here, the electronic computer which performs a pairing computation is the electronic computer which makes executable the pairing computation program integrating a program based on the Miller's algorithm shown in FIG. 2. As shown in FIG. 4, the electronic computer 10 includes: CPU 11 which performs arithmetic operations; memory unit 12 such as a hard disk or the like which stores various programs such as a pairing computation program and data used in the pairing computation program; and memory unit 13 constituted of RAM or the like which as well as expands the pairing computation program and makes it executable, temporally stores data generated in the course of execution of the pairing computation program. In FIG. 4, numeral 14 is a bus. In addition, the electronic computer 10 further includes a non-transitory recording medium drive not shown in the drawing, and hence, it is possible to allow memory unit 12 to store the non-transitory recording medium which records the pairing computation program via the non-transitory recording medium drive.

In the digital group signature technique which uses the pairing computation program according to the present invention, the electronic computer 10 makes it possible to connect to telecommunication lines 20 such as the Internet and to receive signature data of the digital group signature transmitted from client device 30 which is connected to the telecommunication lines 20. In FIG. 4, numeral 15 is an input output control part of the electronic computer 10. The electronic computer 10 temporally stores signature data of the digital group signature transmitted from the client device 30 in the memory unit 13.

The CPU 11 of the electronic computer 10, when signature data of the digital group signature is transmitted from the client device 30, temporally stores the transmitted signature data in the memory unit 13 and starts a pairing computation program (step S1).

By means of the started pairing computation program, the CPU 11 of the electronic computer 10 functions as an input unit, receives inputs of s=t-1 based on a trace t of the Frobenius endomorphism $\phi_p$, P which satisfies $P \in E(F_p)$, and Q' which satisfies $Q' \in E'(F_p^2)$ (step S2). The signature data temporally stored in the memory unit 13 is any one of P and Q' and is generally P. Q' and the trace t of the Frobenius endomorphism $\phi_p$ or s=t-1 are stored in the predetermined address of the memory unit 13, and hence, they are read out from the predetermined address and inputted.

Next, the CPU 11 of the electronic computer 10 functions as a substitution unit and performs substitution operations $n \leftarrow x_p v^{-1/3}$, $m \leftarrow y_p v^{-1/2}$ with respect to coordinates of the rational point P $(x_p, y_p)$ (step S3). Here, a value of $v^{-1/3}$ and a value of $v^{-1/2}$ are know and are store in the predetermined address in the memory unit 12 or the memory unit 13 and hence calculation of $x_p v^{-1/3}$ and $y_p v^{-1/2}$ are performed by reading them out from the predetermined address and inputting them.

In addition, these substitution operations, since the embedding degree is 12-th degree and a degree of a multiple of 6, are $n \leftarrow x_p v^{-1/3}$, $m \leftarrow y_p v^{-1/2}$, however in the case of the embedding degree being an even number degree, substitution operations are $n \leftarrow x_p v^{-1}$, $m \leftarrow y_p v^{-3/2}$, in the case of the embedding degree being a multiple of 3, substitution operations are $n \leftarrow x_p v^{-1/3}$, $m \leftarrow y_p v^{-1/2}$, and in the case of the embedding degree being a multiple of 4, substitution operations are $n \leftarrow x_p v^{-1/2}$, $m \leftarrow y_p v^{-3/4}$.

Next, the CPU 11 of the electronic computer 10 functions as the substitution unit and performs substitution operations $f \leftarrow 1$, $T' \leftarrow Q'$ (step S4). This is a so-called initial value setting.

Next, the CPU 11 of the electronic computer 10 calculates a value of f, by setting the number of bits of s in binary representation as an initial value of i, and by decrementing i by 1 for each iteration of the following arithmetic operations (step S5). Here, as described above, s[i] denotes a value of the i-th bit counted from the least bit of s in binary representation.

In step S5, to be more specific, the CPU 11 of the electronic computer 10 functions as a first arithmetic operation unit, calculates $l_{T,T}(x_p,y_p)v^{-1/2}$ as $l_{T',T}(n,m)$ and performs a substitution operation of $f \leftarrow f^2 \cdot l_{T',T}(n,m)$ instead of calculating a value of $l_{T,T}(x_p,y_p)$ substituted by coordinates $(x_p,y_p)$ of the rational point P in the left hand side of the tangent line $l_{T,T}(x,y)=0$ passing through the rational point T, then next, the CPU 11 of the electronic computer 10 functions as a second arithmetic operation unit and performs a substitution operation of $T' \leftarrow 2T'$.

Further, in the case where a value of s[i] which is the i-th bit of s in binary representation is 1, the CPU 11 of the electronic computer 10 functions as the third arithmetic operation unit, calculates $l_{T,Q}(x_p,y_p)v^{-1/2}$ as $l_{T',Q}(n,m)$ and performs a substitution operation of $f \leftarrow f \cdot l_{T',Q}(n,m)$ instead of calculating a value $l_{T,Q}(x_p,y_p)$ substituted by coordinates $(x_p,y_p)$ of the rational point P in the left hand side of the straight line $l_{T,Q}(x,y)=0$ passing through the rational points T and Q, then next, the CPU 11 of the electronic computer 10 functions as the fourth arithmetic operation unit and performs a substitution operation of $T' \leftarrow T' + Q'$.

After calculation in step S5, the CPU 11 of the electronic computer 10 temporally stores a calculation result f in the memory unit 13 and finishes the calculation of the Miller function (step S6).

Next, the CPU 11 of the electronic computer 10 performs an exponentiation to the power of $(q^{12}-1)/r$ using the calculation result of f, and temporally stores the result as a result of pairing computation in the memory unit 13 (step S7).

The CPU 11 of the electronic computer 10 iterates the above described pairing computation the number of times corresponding to the number of invalidated users and finishes the pairing computation program.

In the case where the electronic computer 10 is an authentication server, after that, the CPU 11 of the electronic computer 10 performs authentication using the result of the pairing computation.

In this way, in a pairing computation device constituted of an electronic computer which performs a pairing computation, in the case where an embedding degree is 12, by performing pairing computation as an elliptic curve addition on $E'(F_{p^2})[r]$ instead of an elliptic curve addition on $E(F_{p^{12}})[r]$, it is possible to reduce the required time based on Miller's algorithm by approximately 30%, thus enabling to perform a pairing computation at higher speed.

Therefore, it is possible to utilize the pairing computation for the digital group signature with more members and to utilize the digital group signature in a broader range.

In the embodiment according to the present invention, the explanation about pairing computation used in digital group signature has been made, however, a pairing computation device, a pairing computation method and a non-transitory recording medium recording a pairing computation program are not limited to the case where they are used for digital group signature and are applicable to appropriate pairing computation as needed.

What is claimed is:

1. A pairing computation device, wherein an elliptic curve equation is given as $y^2=x^3+ax+b$, $a \in F_q$, $b \in F_q$, q is a prime number greater than 3, letting an embedding degree be 2h-th degree, h is a natural number, E be an additive group constituted of rational points on a pairing-enabled elliptic curve defined over $F_q^{2h}$, E[r] be a set of rational points of prime order r, and $\phi_q$ be a Frobenius endomorphism, an Ate pairing e is defined, using $$G_1 = E[r] \cap \text{Ker}(\phi_q - [1])$$

$$G_2 = E[r] \cap \text{Ker}(\phi_q - [q]),$$

as a non-degenerate bilinear map $$e: G_2 \times G_1 \to F_q^{*2h}/(F_q^{*2h})^r,$$

letting $P \in G_1$, $Q \in G_2$, and letting $s = t-1$ using a trace t of the Frobenius endomorphism $\phi_q$, and using a Miller function $f_{s,Q}(\bullet)$, the Ate pairing $e(Q,P)$ is computed as $$e(Q, P) = f_{s,Q}(P)^{\frac{q^{2h}-1}{r}}, \quad [E1]$$

the pairing computation device characterized by comprising: in order to perform an arithmetic operation of a rational function which is required to derive $f_{s,Q}(P)$ on a proper subfield by a twist curve of $E(F_q^h)$, that is, $E'(F_q^h): y^2 = x^3 + av^{-2}x + bv^{-3}$ using $v \in F_q^h$ which is a quadratic non-residue element and becomes 1 by an exponentiation of $f_{s,Q}(P)$ to a power of $(q^{2h}-1)/r$, an input unit which is configured to receive inputs of said $s=t-1$, P which satisfies $P \in E(F_q)$, and Q' which satisfies $Q' \in E'(F_q^h)$;

a substitution unit which is configured to perform substitution operations $n \leftarrow x_p v^{-1}$, $m \leftarrow y_p v^{-3/2}$ with respect to coordinates of the rational point P $(x_p,y_p)$ and to perform substitution operations $f \leftarrow 1$, $T' \leftarrow Q'$;

a first arithmetic operation unit which is configured to calculate $l_{T,T}(x_p,y_p)v^{-3/2}$ as $l_{T',T}(n,m)$, instead of calculating $l_{T,T}(x_p,y_p)$ which is a value substituted by coordinates $(x_p,y_p)$ of the rational point P in the left hand side of an equation $l_{T,T}(x,y)=0$ of a tangent line passing through the rational point T, and to perform a substitution operation $f \leftarrow f^2 \cdot l_{T',T}(n,m)$;

a second arithmetic operation unit which is configured to perform a substitution operation $T' \leftarrow 2T'$;

a third arithmetic operation unit which is configured, when a value of a predetermined bit of s in binary representation is 1, to calculate $l_{T,Q}(x_p,y_p)v^{-3/2}$ as $l_{T',Q}(n,m)$, instead of calculating $l_{T,Q}(x_p,y_p)$ which is a value substituted by coordinates of the rational point P in the left hand side of an equation $l_{T,Q}(x,y)=0$ of a straight line passing through the rational points T and Q, and to perform a substitution operation $f \leftarrow f \cdot l_{T',Q}(n,m)$;

a fourth arithmetic operation unit which is configured, when a value of the predetermined bit of s in binary representation is 1, to perform a substitution operation $T' \leftarrow T' + Q'$; and a fifth arithmetic operation unit which is configured to perform an exponentiation operation to the power of $(q^{2h}-1)/r$.

2. A pairing computation device, wherein an elliptic curve equation is given as $y^2 = x^3 + a$, $a \in F_q$, q is a power of a prime number greater than 3, letting an embedding degree be 3h-th degree, h is a natural number, E be an additive group constituted of rational points on a pairing-enabled elliptic curve defined over $F_q^{3h}$, E[r] be a set of rational points of prime order r, and $\phi_q$ be a Frobenius endomorphism, an Ate pairing e is defined, using $G_1 = E[r] \cap \mathrm{Ker}(\phi_q - [1])$ $G_2 = E[r] \cap \mathrm{Ker}(\phi_q - [q])$ as a non-degenerate bilinear map, $e: G_2 \times G_1 \to F_q^{*\,3h}/(F_q^{*\,3h})^r$ and letting P∈$G_1$, Q∈$G_2$, and letting s=t−1 using a trace t of the Frobenius endomorphism $\phi_q$, and using a Miller function $f_{s,Q}(\bullet)$, the Ate pairing e(Q,P) is computed as $$e(Q, P) = f_{s,Q}(P)^{\frac{q^{3h}-1}{r}}, \qquad [E2]$$

the pairing computation device characterized by comprising: in order to perform an arithmetic operation of a rational function which is required to derive $f_{s,Q}(P)$ on a proper subfield by a twist curve of $E(F_q^h)$, that is, $E'(F_q^h):y^2=x^3+av^{-1}$ using v ∈$F_q^h$ which is a quadratic and cubic non-residue element and becomes 1 by an exponentiation of $f_{s,Q}(P)$ to a power of $(q^{3h}−1)/r$,
- an input unit which is configured to receive inputs of said s=t−1, P which satisfies P∈$E(F_q)$, and Q' which satisfies Q'∈$E'(F_q^h)$;
- a substitution unit which is configured to perform substitution operations n←$x_p v^{-1/3}$, m←$y_p v^{-1/2}$ with respect to coordinates of the rational point P ($x_p,y_p$) and to perform substitution operations f←1, T'←Q';
- a first arithmetic operation unit which is configured to calculate $1_{T,T}(x_p,y_p)v^{-1/2}$ as $1_{T',T'}(n,m)$, instead of calculating $1_{T,T}(x_p,y_p)$ which is a value substituted by coordinates ($x_p,y_p$) of the rational point P in the left hand side of an equation $1_{T,T}(x,y)=0$ of a tangent line passing through the rational point T, and to perform a substitution operation f←$f^2 \cdot 1_{T',T'}(n,m)$;
- a second arithmetic operation unit which is configured to perform a substitution operation T'←2T';
- a third arithmetic operation unit which is configured, when a value of a predetermined bit of s in binary representation is 1, to calculate $1_{T,Q}(x_p,y_p)v^{-1/2}$ as $1_{T',Q'}(n,m)$, instead of calculating $1_{T,Q}(x_p,y_p)$ which is a value substituted by coordinates of the rational point P in the left hand side of an equation $1_{T,Q}(x,y)=0$ of a straight line passing through the rational points T and Q, and to perform a substitution operation f←$f \cdot 1_{T',Q'}(n,m)$;
- a fourth arithmetic operation unit which is configured, when a value of the predetermined bit of s in binary representation is 1, to perform a substitution operation T'←T'+Q'; and
- a fifth arithmetic operation unit which is configured to perform an exponentiation operation to the power of $(q^{3h}−1)/r$.

3. A pairing computation device, wherein an elliptic curve equation is given as $y^2=x^3+ax$, a∈$F_q$, q is a power of a prime number greater than 3, letting an embedding degree be 4h-th degree, h is a natural number, $q^h−1$ be dividable by 4, E be an additive group constituted of rational points on a pairing-enabled elliptic curve defined over $F_q^{4h}$, E[r] be a set of rational points of prime order r, and $\phi_q$ be a Frobenius endomorphism, an Ate pairing e is defined, using $G_1 = E[r] \cap \mathrm{Ker}(\phi_q - [1])$ $G_2 = E[r] \cap \mathrm{Ker}(\phi_q - [q])$ as a non-degenerate bilinear map $e: G_2 \times G_1 \to F_q^{*\,4h}/(F_q^{*\,4h})^r$, and letting P∈$G_1$, Q∈$G_2$, and letting s=t−1 using a trace t of the Frobenius endomorphism $\phi_q$, and using a Miller function $f_{s,Q}(\bullet)$, the Ate pairing e(Q,P) is computed as $$e(Q, P) = f_{s,Q}(P)^{\frac{q^{4h}-1}{r}}, \qquad [E3]$$

the pairing computation device characterized by comprising: in order to perform an arithmetic operation of a rational function which is required to derive $f_{s,Q}(P)$ on a proper subfield by a twist curve of $E(F_q^h)$, that is, $E'(F_q^h):y^2=x^3+av^{-1}x$ using v ∈$F_q^h$ which is a quadratic non-residue element and becomes 1 by an exponentiation of $f_{s,Q}(P)$ to a power of $(q^{4h}−1)/r$,
- an input unit which is configured to receive inputs of said s=t−1, P which satisfies P∈$E(F_q)$, and Q' which satisfies Q'∈$E'(F_q^h)$;
- a substitution unit which is configured to perform substitution operations n←$x_p v^{-1/2}$, m←$y_p v^{-3/4}$ with respect to coordinates of the rational point P ($x_p,y_p$) and to perform substitution operations f←1, T'←Q';
- a first arithmetic operation unit which is configured to calculate $1_{T,T}(x_p,y_p)v^{-3/4}$ as $1_{T',T'}(n,m)$, instead of calculating $1_{T,T}(x_p,y_p)$ which is a value substituted by coordinates ($x_p,y_p$) of the rational point P in the left hand side of an equation $1_{T,T}(x,y)=0$ of a tangent line passing through the rational point T, and to perform a substitution operation f←$f^2 \cdot 1_{T',T'}(n,m)$;
- a second arithmetic operation unit which is configured to perform a substitution operation T'←2T';
- a third arithmetic operation unit which is configured, when a value of a predetermined bit of s in binary representation is 1, to calculate $1_{T,Q}(x_p,y_p)v^{-3/4}$ as $1_{T',Q'}(n,m)$, instead of calculating $1_{T,Q}(x_p,y_p)$ which is a value substituted by coordinates of the rational point P in the left hand side of an equation $1_{T,Q}(x,y)=0$ of a straight line passing through the rational points T and Q, and to perform a substitution operation f←$f \cdot 1_{T',Q'}(n,m)$;
- a fourth arithmetic operation unit which is configured, when a value of the predetermined bit of s in binary representation is 1, to perform a substitution operation T'←T'+Q'; and
- a fifth arithmetic operation unit which is configured to perform an exponentiation operation to the power of $(q^{4h}−1)/r$.

4. A pairing computation device, wherein an elliptic curve equation is given as $y^2=x^3+a$, a∈$F_q$, q is a power of a prime number greater than 3, letting an embedding degree be 6h-th degree, h is a natural number, E be an additive group constituted of rational points on a pairing-enabled elliptic curve defined over $F_q^{6h}$, E[r] be a set of rational points of prime order r, and $\phi_q$ be a Frobenius endomorphism, an Ate pairing e is defined, using $G_1 = E[r] \cap \mathrm{Ker}(\phi_q - [1])$ $G_2 = E[r] \cap \mathrm{Ker}(\phi_q - [q])$, as a non-degenerate bilinear map $e: G_2 \times G_1 \to F_q^{*\,6h}/(F_q^{*\,6h})^r$, and letting $P \in G_1$, $Q \in G_2$, and letting $s=t-1$ using a trace t of the Frobenius endomorphism $\phi_q$, and using a Miller function $f_{s,Q}(\bullet)$, the Ate pairing $e(Q,P)$ is computed as $$e(Q, P) = f_{s,Q}(P)^{\frac{q^{6h}-1}{r}}, \quad [E4]$$

the pairing computation device characterized by comprising: in order to perform an arithmetic operation of a rational function which is required to derive $f_{s,Q}(P)$ on a proper subfield by a twist curve of $E(F_q^h)$, that is, $E'(F_q^h):y^2=x^3+av^{-1}$ using $v \in F_q^h$ which is a quadratic and cubic non-residue element and becomes 1 by an exponentiation of $f_{s,Q}(P)$ to a power of $(q^{6h}-1)/r$,
- an input unit which is configured to receive inputs of said $s=t-1$, P which satisfies $P \in E(F_q)$, and Q' which satisfies $Q' \in E'(F_q^h)$;
- a substitution unit which is configured to perform substitution operations $n \leftarrow x_p v^{-1/3}$, $m \leftarrow y_p v^{-1/2}$ with respect to coordinates of the rational point $P(x_p, y_p)$ and to perform substitution operations $f \leftarrow 1$, $T' \leftarrow Q'$;
- a first arithmetic operation unit which is configured to calculate $l_{T,T}(x_p,y_p)v^{-1/2}$ as $l_{T',T'}(n,m)$, instead of calculating $l_{T,T}(x_p,y_p)$ which is a value substituted by coordinates $(x_p,y_p)$ of the rational point P in the left hand side of an equation $l_{T,T}(x,y)=0$ of a tangent line passing through the rational point T, and to perform a substitution operation $f \leftarrow f^2 \cdot l_{T',T'}(n,m)$;
- a second arithmetic operation unit which is configured to perform a substitution operation $T' \leftarrow 2T'$;
- a third arithmetic operation unit which is configured, when a value of a predetermined bit of s in binary representation is 1, to calculate $l_{T,Q}(x_p,y_p)v^{-1/2}$ as $l_{T,Q}(n,m)$, instead of calculating $l_{T,Q}(x_p,y_p)$ which is a value substituted by coordinates of the rational point P in the left hand side of an equation $l_{T,Q}(x,y)=0$ of a straight line passing through the rational points T and Q, and to perform a substitution operation $f \leftarrow f \cdot l_{T',Q'}(n,m)$;
- a fourth arithmetic operation unit which is configured, when a value of the predetermined bit of s in binary representation is 1, to perform a substitution operation $T' \leftarrow T'+Q'$; and
- a fifth arithmetic operation unit which is configured to perform an exponentiation operation to the power of $(q^{6h}-1)/r$.

5. A pairing computation method, wherein an elliptic curve equation is given as $y^2=x^3+ax+b$, $a \in F_q$, $b \in F_q$, q is a power of a prime number greater than 3, letting an embedding degree be 2h-th degree, h is a natural number, E be an additive group constituted of rational points on a pairing-enabled elliptic curve defined over $F_q^{2h}$, E[r] be a set of rational points of prime order r, and $\phi_q$ be a Frobenius endomorphism, an Ate pairing e is defined, using $$G_1 = E[r] \cap \mathrm{Ker}(\phi_q - [1])$$

$$G_2 = E[r] \cap \mathrm{Ker}(\phi_q - [q]),$$

as a non-degenerate bilinear map $$e: G_2 \times G_1 \to F_q^{*2h}/(F_q^{*2h})^r,$$

and letting $P \in G_1$, $Q \in G_2$, and letting $s=t-1$ using a trace t of the Frobenius endomorphism $\phi_q$, and using a Miller function $f_{s,Q}(\bullet)$, the Ate pairing $e(Q,P)$, by using an electronic computer, is computed as $$e(Q, P) = f_{s,Q}(P)^{\frac{q^{2h}-1}{r}}, \quad [E5]$$

the pairing computation method characterized by using $v \in F_q^h$ which is a quadratic non-residue element and becomes 1 by an exponentiation of $f_{s,Q}(P)$ to a power of $(q^{2h}-1)/r$ and a twist curve of $E(F_q^h)$, that is, $E'(F_q^h):y^2=x^3+av^{-2}x+bv^{-3}$, and by comprising:
- a step of receiving inputs of said $s=t-1$, P which satisfies $P \in E(F_q)$, and Q' which satisfies $Q' \in E'(F_q^h)$, by causing the electronic computer to function as an input unit;
- a step of performing substitution operations $n \leftarrow x_p v^{-1}$, $m \leftarrow y_p v^{-3/2}$ with respect to coordinates of the rational point $P(x_p, y_p)$, by causing the electronic computer to function as a substitution unit;
- a step of performing substitution operations $f \leftarrow 1$, $T' \leftarrow Q'$, by causing the electronic computer to function as a substitution unit;
- a step of calculating $l_{T,T}(x_p,y_p)v^{-3/2}$ as $l_{T',T'}(n,m)$, instead of calculating $l_{T,T}(x_p,y_p)$ which is a value substituted by coordinates $(x_p,y_p)$ of the rational point P in the left hand side of an equation $l_{T,T}(x,y)=0$ of a tangent line passing through the rational point T, and performing a substitution operation $f \leftarrow f^2 \cdot l_{T',T'}(n,m)$, by causing the electronic computer to function as a first arithmetic operation unit;
- a step of performing a substitution operation $T' \leftarrow 2T'$, by causing the electronic computer to function as a second arithmetic operation unit;
- a step of, when a value of a predetermined bit of s in binary representation is 1, calculating $l_{T,Q}(x_p,y_p)v^{-3/2}$ as $l_{T',Q'}(n,m)$, instead of calculating $l_{T,Q}(x_p,y_p)$ which is a value substituted by coordinates of the rational point P in the left hand side of an equation $l_{T,Q}(x,y)=0$ of a straight line passing through the rational points T and Q, and performing a substitution operation $f \leftarrow f \cdot l_{T',Q'}(n,m)$, by causing the electronic computer to function as a third arithmetic operation unit;
- a step of, when a value of the predetermined bit of s in binary representation is 1, performing a substitution operation $T' \leftarrow T'+Q'$, by causing the electronic computer to function as a fourth arithmetic operation unit; and
- a step of performing an exponentiation operation to the power of $(q^{2h}-1)/r$, by causing the electronic computer to function as a fifth arithmetic operation unit.

6. A pairing computation method, wherein an elliptic curve equation is given as $y^2=x^3+a$, $a \in F_q$, q is a power of a prime number greater than 3, letting an embedding degree be 3h-th degree, h is a natural number, E be an additive group constituted of rational points on a pairing-enabled elliptic curve defined over $F_q^{3h}$, E[r] be a set of rational points of prime order r, and $\phi_q$ be a Frobenius endomorphism, an Ate pairing e is defined, using $$G_1 = E[r] \cap \mathrm{Ker}(\phi_q - [1])$$

$$G_2 = E[r] \cap \mathrm{Ker}(\phi_q - [q]),$$

as a non-degenerate bilinear map $$e: G_2 \times G_1 \to F_q^{*3h}/(F_q^{*3h})^r,$$

and letting $P \in G_1$, $Q \in G_2$, and letting $s=t-1$ using a trace t of the Frobenius endomorphism $\phi_q$, and using a Miller function $f_{s,Q}(\bullet)$, the Ate pairing $e(Q,P)$, by using an electronic computer, is computed as, $$e(Q, P) = f_{s,Q}(P)^{\frac{q^{3h}-1}{r}}, \quad [E6]$$

the pairing computation method characterized by using $v \in F_q^h$ which is a quadratic and cubic non-residue element and becomes 1 by an exponentiation of $f_{s,Q}(P)$ to a power of $(q^{3h}-1)/r$ and a twist curve of $E(F_q^h)$, that is, $E'(F_q^h):y^2=x^3+av^{-1}$, and by comprising:
- a step of receiving inputs of said $s=t-1$, P which satisfies $P \in E(F_q)$, and Q' which satisfies $Q' \in E'(F_q^h)$, by causing the electronic computer to function as an input unit;
- a step of performing substitution operations $n \leftarrow x_p v^{-1/3}$, $m \leftarrow y_p v^{-1/2}$ with respect to coordinates of the rational point P $(x_p, y_p)$, by causing the electronic computer to function as a substitution unit;
- a step of performing substitution operations $f \leftarrow 1$, $T' \leftarrow Q'$, by causing the electronic computer to function as a substitution unit;
- a step of calculating $l_{T,T}(x_p, y_p)v^{-1/2}$ as $l_{T',T'}(n,m)$, instead of calculating $l_{T,T}(x_p, y_p)$ which is a value substituted by coordinates $(x_p, y_p)$ of the rational point P in the left hand side of an equation $l_{T,T}(x,y)=0$ of a tangent line passing through the rational point T, and performing a substitution operation $f \leftarrow f^2 \cdot l_{T',T'}(n,m)$, by causing the electronic computer to function as a first arithmetic operation unit;
- a step of performing a substitution operation $T' \leftarrow 2T'$, by causing the electronic computer to function as a second arithmetic operation unit;
- a step of, when a value of a predetermined bit of s in binary representation is 1, calculating $l_{T,Q}(x_p, y_p)v^{-1/2}$ as $l_{T',Q'}(n,m)$, instead of calculating $l_{T,Q}(x_p, y_p)$ which is a value substituted by coordinates of the rational point P in the left hand side of an equation $l_{T,Q}(x,y)=0$ of a straight line passing through the rational points T and Q, and performing a substitution operation $f \leftarrow f \cdot l_{T',Q'}(n,m)$, by causing the electronic computer to function as a third arithmetic operation unit;
- a step of, when a value of the predetermined bit of s in binary representation is 1, performing a substitution operation $T' \leftarrow T'+Q'$, by causing the electronic computer to function as a fourth arithmetic operation unit; and
- a step of performing an exponentiation operation to the power of $(q^{3h}-1)/r$, by causing the electronic computer to function as a fifth arithmetic operation unit.

7. A pairing computation method, wherein an elliptic curve equation is given as $y^2=x^3+ax$, $a \in F_q$, q is a power of a prime number greater than 3, letting an embedding degree be 4h-th degree, h is a natural number, $q^h-1$ be dividable by 4, E be an additive group constituted of rational points on a pairing-enabled elliptic curve defined over $F_q^{4h}$, E[r] be a set of rational points of prime order r, and $\phi_q$ be a Frobenius endomorphism, an Ate pairing e is defined, using $$G_1 = E[r] \cap \mathrm{Ker}(\phi_q - [1])$$

$$G_2 = E[r] \cap \mathrm{Ker}(\phi_q - [q]),$$

as a non-degenerate bilinear map $$e: G_2 \times G_1 \to F^*_{q^{4h}}/(F^*_{q^{4h}})^r,$$

and letting $P \in G_1$, $Q \in G_2$, and letting $s=t-1$ using a trace t of the Frobenius endomorphism $\phi_q$, and using a Miller function $f_{s,Q}(\cdot)$, the Ate pairing $e(Q,P)$, by using an electronic computer, is computed as $$e(Q, P) = f_{s,Q}(P)^{\frac{q^{4h}-1}{r}}, \quad [E7]$$

the pairing computation method characterized by using $v \in F_q^h$ which is a quadratic non-residue element and becomes 1 by an exponentiation of $f_{s,Q}(P)$ to a power of $(q^{4h}-1)/r$ and a twist curve of $E(F_q^h)$, that is, $E'(F_q^h):y^2=x^3+av^{-1}x$, and by comprising:
- a step of receiving inputs of said $s=t-1$, P which satisfies $P \in E(F_q)$, and Q' which satisfies $Q' \in E'(F_q^h)$, by causing the electronic computer to function as an input unit;
- a step of performing substitution operations $n \leftarrow x_p v^{-1/2}$, $m \leftarrow y_p v^{-3/4}$ with respect to coordinates of the rational point P $(x_p, y_p)$, by causing the electronic computer to function as a substitution unit;
- a step of performing substitution operations $f \leftarrow 1$, $T' \leftarrow Q'$, by causing the electronic computer to function as a substitution unit;
- a step of calculating $l_{T,T}(x_p, y_p)v^{-3/4}$ as $l_{T',T'}(n,m)$, instead of calculating $l_{T,T}(x_p, y_p)$ which is a value substituted by coordinates $(x_p, y_p)$ of the rational point P in the left hand side of an equation $l_{T,T}(x,y)=0$ of a tangent line passing through the rational point T, and performing a substitution operation $f \leftarrow f^2 \cdot l_{T',T'}(n,m)$, by causing the electronic computer to function as a first arithmetic operation unit;
- a step of performing a substitution operation $T' \leftarrow 2T'$, by causing the electronic computer to function as a second arithmetic operation unit;
- a step of, when a value of a predetermined bit of s in binary representation is 1, calculating $l_{T,Q}(x_p, y_p)v^{-3/4}$ as $l_{T',Q'}(n,m)$, instead of calculating $l_{T,Q}(x_p, y_p)$ which is a value substituted by coordinates of the rational point P in the left hand side of an equation $l_{T,Q}(x,y)=0$ of a straight line passing through the rational points T and Q, and performing a substitution operation $f \leftarrow f \cdot l_{T',Q'}(n,m)$, by causing the electronic computer to function as a third arithmetic operation unit;
- a step of, when a value of the predetermined bit of s in binary representation is 1, performing a substitution operation $T' \leftarrow T'+Q'$, by causing the electronic computer to function as a fourth arithmetic operation unit; and
- a step of performing an exponentiation operation to the power of $(q^{4h}-1)/r$, by causing the electronic computer to function as a fifth arithmetic operation unit.

8. A pairing computation method, wherein an elliptic curve equation is given as $y^2=x^3+a$, $a \in F_q$, q is a power of a prime number greater than 3, letting an embedding degree be 6h-th degree, h is a natural number, E be an additive group constituted of rational points on a pairing-enabled elliptic curve defined over $F_q^{6h}$, E[r] be a set of rational points of prime order r, and $\phi_q$ be a Frobenius endomorphism, an Ate pairing e is defined, using $$G_1 = E[r] \cap \mathrm{Ker}(\phi_q - [1])$$

$$G_2 = E[r] \cap \mathrm{Ker}(\phi_q - [q]),$$

as a non-degenerate bilinear map $$e: G_2 \times G_1 \to F^*_{q^{6h}}/(F_q^{6h})^r,$$

and letting $P \in G_1$, $Q \in G_2$, and letting $s=t-1$ using a trace t of the Frobenius endomorphism $\phi_q$, and using a Miller function $f_{s,Q}(\cdot)$, the Ate pairing $e(Q,P)$, by using an electronic computer, is computed as $$e(Q, P) = f_{s,Q}(P)^{\frac{q^{6h}-1}{r}}, \quad [E8]$$

the pairing computation method characterized by using $v \in F_q^h$ which is a quadratic and cubic non-residue element and becomes 1 by an exponentiation of $f_{s,Q}(P)$ to a power of $(q^{6h}-1)/r$ and a twist curve of $E(F_q^h)$, that is, $E'(F_q^h): y^2 = x^3 + av^{-1}$, and by comprising:

a step of receiving inputs of said $s = t-1$, P which satisfies $P \in E(F_q)$, and Q' which satisfies $Q' \in E'(F_q^h)$, by causing the electronic computer to function as an input unit;

a step of performing substitution operations $n \leftarrow x_p v^{-1/3}$, $m \leftarrow y_p v^{-1/2}$ with respect to coordinates of the rational point P $(x_p, y_p)$, by causing the electronic computer to function as a substitution unit;

a step of performing substitution operations $f \leftarrow 1$, $T' \leftarrow Q'$, by causing the electronic computer to function as a substitution unit;

a step of calculating $l_{T,T}(x_p, y_p)v^{-1/2}$ as $l_{T',T'}(n,m)$, instead of calculating $l_{T,T}(x_p, y_p)$ which is a value substituted by coordinates $(x_p, y_p)$ of the rational point P in the left hand side of an equation $l_{T,T}(x,y) = 0$ of a tangent line passing through the rational point T, and performing a substitution operation $f \leftarrow f^2 \cdot l_{T',T'}(n,m)$, by causing the electronic computer to function as a first arithmetic operation unit;

a step of performing a substitution operation $T' \leftarrow 2T'$, by causing the electronic computer to function as a second arithmetic operation unit;

a step of, when a value of a predetermined bit of s in binary representation is 1, calculating $l_{T,Q}(x_p, y_p)v^{-1/2}$ as $l_{T',Q'}(n,m)$, instead of calculating $l_{T,Q}(x_p, y_p)$ which is a value substituted by coordinates of the rational point P in the left hand side of an equation $l_{T,Q}(x,y) = 0$ of a straight line passing through the rational points T and Q, and performing a substitution operation $f \leftarrow f \cdot l_{T',Q'}(n,m)$, by causing the electronic computer to function as a third arithmetic operation unit;

a step of, when a value of the predetermined bit of s in binary representation is 1, performing a substitution operation $T' \leftarrow T' + Q'$, by causing the electronic computer to function as a fourth arithmetic operation unit; and a step of performing an exponentiation operation to the power of $(q^{6h}-1)/r$, by causing the electronic computer to function as a fifth arithmetic operation unit.

9. A non-transitory recording medium recording a pairing computation program, wherein an elliptic curve equation is given as $y^2 = x^3 + ax + b$, $a \in F_q$, $b \in F_q$, q is a power of a prime number greater than 3, letting an embedding degree be 2h-th degree, h is a natural number, E be an additive group constituted of rational points on a pairing-enabled elliptic curve defined over $F_q^{2h}$, E[r] be a set of rational points of prime order r, and $\phi_q$ be a Frobenius endomorphism, an Ate pairing e is defined, using $$G_1 = E[r] \cap \text{Ker}(\phi_q - [1])$$

$$G_2 = E[r] \cap \text{Ker}(\phi_q - [q]),$$

as a non-degenerate bilinear map $$e: G_2 \times G_1 \to F_q^{*2h}/(F_q^{*2h})^r,$$

and letting $P \in G_1$, $Q \in G_2$, and letting $s = t-1$ using a trace t of the Frobenius endomorphism $\phi_q$, and using a Miller function $f_{s,Q}(\bullet)$, an electronic computer is caused to compute the Ate pairing $e(Q,P)$ as $$e(Q, P) = f_{s,Q}(P)^{\frac{q^{2h}-1}{r}},$$

the pairing computation program characterized by using $v \in F_q^h$ which is a quadratic non-residue element and becomes 1 by an exponentiation of $f_{s,Q}(P)$ to a power of $(q^{2h}-1)/r$ and a twist curve of $E(F_q^h)$, that is, $E'(F_q^h): y^2 = x^3 + av^{-2}x + bv^{-3}$, and by causing the electronic computer to perform:

a step of receiving inputs of said $s = t-1$, P which satisfies $P \in E(F_q)$, and Q' which satisfies $Q' \in E'(F_q^h)$, by causing the electronic computer to function as an input unit;

a step of performing substitution operations $n \leftarrow x_p v^{-1}$, $m \leftarrow y_p v^{-3/2}$ with respect to coordinates of the rational point P $(x_p, y_p)$, by causing the electronic computer to function as a substitution unit;

a step of performing substitution operations $f \leftarrow 1$, $T' \leftarrow Q'$, by causing the electronic computer to function as a substitution unit;

a step of calculating $l_{T,T}(x_p, y_p)v^{-3/2}$ as $l_{T',T'}(n,m)$, instead of calculating $l_{T,T}(x_p, y_p)$ which is a value substituted by coordinates $(x_p, y_p)$ of the rational point P in the left hand side of an equation $l_{T,T}(x,y) = 0$ of a tangent line passing through the rational point T, and performing a substitution operation $f \leftarrow f^2 \cdot l_{T',T'}(n,m)$, by causing the electronic computer to function as a first arithmetic operation unit;

a step of performing a substitution operation $T' \leftarrow 2T'$, by causing the electronic computer to function as a second arithmetic operation unit;

a step of, when a value of a predetermined bit of s in binary representation is 1, calculating $l_{T,Q}(x_p, y_p)v^{-3/2}$ as $l_{T',Q'}(n,m)$, instead of calculating $l_{T,Q}(x_p, y_p)$ which is a value substituted by coordinates of the rational point P in the left hand side of an equation $l_{T,Q}(x,y) = 0$ of a straight line passing through the rational points T and Q, and performing a substitution operation $f \leftarrow f \cdot l_{T',Q'}(n,m)$, by causing the electronic computer to function as a third arithmetic operation unit;

a step of, when a value of the predetermined bit of s in binary representation is 1, performing a substitution operation $T' \leftarrow T' + Q'$, by causing the electronic computer to function as a fourth arithmetic operation unit; and a step of performing an exponentiation operation to the power of $(q^{2h}-1)/r$, by causing the electronic computer to function as a fifth arithmetic operation unit.

10. A non-transitory recording medium recording a pairing computation program, wherein an elliptic curve equation is given as $y^2 = x^3 + a$, $a \in F_q$, q is a power of a prime number greater than 3, letting an embedding degree be 3h-th degree, h is a natural number, E be an additive group constituted of rational points on a pairing-enabled elliptic curve defined over $F_q^{3h}$, E[r] be a set of rational points of prime order r, and $\phi_q$ be a Frobenius endomorphism, an Ate pairing e is defined, using $$G_1 = E[r] \cap \text{Ker}(\phi_q - [1])$$

$$G_2 = E[r] \cap \text{Ker}(\phi_q - [q]),$$

as a non-degenerate bilinear map $$e: G_2 \times G_1 \to F_q^{*3h}/(F_q^{*3h})^r,$$

and letting $P \in G_1$, $Q \in G_2$, and letting $s = t-1$ using a trace t of the Frobenius endomorphism $\phi_q$, and using a Miller function $f_{s,Q}(\bullet)$, an electronic computer is caused to compute the Ate pairing $e(Q,P)$ as $$e(Q, P) = f_{s,Q}(P)^{\frac{q^{3h}-1}{r}},$$

the pairing computation program characterized by using $v \in F_q^h$ which is a quadratic and cubic non-residue element and becomes 1 by an exponentiation of $f_{s,Q}(P)$ to a power of $(q^{3h}-1)/r$ and a twist curve of $E(F_q^h)$, that is, $E'(F_q^h):y^2=x^3+av^{-1}$, and by causing the electronic computer to perform:

a step of receiving inputs of said $s=t-1$, P which satisfies $P \in E(F_q)$, and Q' which satisfies $Q' \in E'(F_q^h)$, by causing the electronic computer to function as an input unit;

a step of performing substitution operations $n \leftarrow x_p v^{-1/3}$, $m \leftarrow y_p v^{-1/2}$ with respect to coordinates of the rational point P $(x_p, y_p)$, by causing the electronic computer to function as a substitution unit;

a step of performing substitution operations $f \leftarrow 1$, $T' \leftarrow Q'$, by causing the electronic computer to function as a substitution unit;

a step of calculating $l_{T,T}(x_p, y_p)v^{-1/2}$ as $l_{T',T'}(n,m)$, instead of calculating $l_{T,T}(x_p, y_p)$ which is a value substituted by coordinates $(x_p, y_p)$ of the rational point P in the left hand side of an equation $l_{T,T}(x,y)=0$ of a tangent line passing through the rational point T, and performing a substitution operation $f \leftarrow f^2 \cdot l_{T',T'}(n,m)$, by causing the electronic computer to function as a first arithmetic operation unit;

a step of performing a substitution operation $T' \leftarrow 2T'$, by causing the electronic computer to function as a second arithmetic operation unit;

a step of, when a value of a predetermined bit of s in binary representation is 1, calculating $l_{T,Q}(x_p, y_p)v^{-1/2}$ as $l_{T',Q'}(n,m)$, instead of calculating $l_{T,Q}(x_p, y_p)$ which is a value substituted by coordinates of the rational point P in the left hand side of an equation $l_{T,Q}(x,y)=0$ of a straight line passing through the rational points T and Q, and performing a substitution operation $f \leftarrow f \cdot l_{T',Q'}(n,m)$ by causing the electronic computer to function as a third arithmetic operation unit;

a step of, when a value of the predetermined bit of s in binary representation is 1, performing a substitution operation $T' \leftarrow T'+Q'$, by causing the electronic computer to function as a fourth arithmetic operation unit; and a step of performing an exponentiation operation to the power of $(q^{3h}-1)/r$, by causing the electronic computer to function as a fifth arithmetic operation unit.

11. A non-transitory recording medium recording a pairing computation program, wherein an elliptic curve equation is given as $y^2=x^3+ax$, $a \in F_q$, q is a power of a prime number greater than 3, letting an embedding degree be 4h-th degree, h is a natural number, $q^h-1$ be dividable by 4, E be an additive group constituted of rational points on a pairing-enabled elliptic curve defined over $F_q^{4h}$, E[r] be a set of rational points of prime order r, and $\phi_q$ be a Frobenius endomorphism, an Ate pairing e is defined, using $$G_1 = E[r] \cap \mathrm{Ker}(\phi_q - [1])$$

$$G_2 = E[r] \cap \mathrm{Ker}(\phi_q - [q]),$$

as a non-degenerate bilinear map $$e: G_2 \times G_1 \to F^*_{q^{4h}}/(F^*_{q^{4h}})^r,$$

and letting $P \in G_1$, $Q \in G_2$, and letting $s=t-1$ using a trace t of the Frobenius endomorphism $\phi_q$, and using a Miller function $f_{s,Q}(\bullet)$, an electronic computer is caused to compute the Ate pairing $e(Q,P)$ as $$e(Q, P) = f_{s,Q}(P)^{\frac{q^{4h}-1}{r}},$$

the pairing computation program characterized by using $v \in F_q^h$ which is a quadratic non-residue element and becomes 1 by an exponentiation of $f_{s,Q}(P)$ to a power of $(q^{4h}-1)/r$ and a twist curve of $E(F_q^h)$, that is, $E'(F_q^h): y^2=x^3+av^{-1}x$, and by causing the electronic computer to perform:

a step of receiving inputs of said $s=t-1$, P which satisfies $P \in E(F_q)$, and Q' which satisfies $Q' \in E'(F_q^h)$, by causing the electronic computer to function as an input unit;

a step of performing substitution operations $n \leftarrow x_p v^{-1/2}$, $m \leftarrow y_p v^{-3/4}$ with respect to coordinates of the rational point P $(x_p, y_p)$, by causing the electronic computer to function as a substitution unit;

a step of performing substitution operations $f \leftarrow 1$, $T' \leftarrow Q'$, by causing the electronic computer to function as a substitution unit;

a step of calculating $l_{T,T}(x_p, y_p)v^{-3/4}$ as $l_{T',T'}(n,m)$, instead of calculating $l_{T,T}(x_p, y_p)$ which is a value substituted by coordinates $(x_p, y_p)$ of the rational point P in the left hand side of an equation $l_{T,T}(x,y)=0$ of a tangent line passing through the rational point T, and performing a substitution operation $f \leftarrow f^2 \cdot l_{T',T'}(n,m)$, by causing the electronic computer to function as a first arithmetic operation unit;

a step of performing a substitution operation $T' \leftarrow 2T'$, by causing the electronic computer to function as a second arithmetic operation unit;

a step of, when a value of a predetermined bit of s in binary representation is 1, calculating $l_{T,Q}(x_p, y_p)v^{-3/4}$ as $l_{T',Q'}(n,m)$, instead of calculating $l_{T,Q}(x_p, y_p)$ which is a value substituted by coordinates of the rational point P in the left hand side of an equation $l_{T,Q}(x,y)=0$ of a straight line passing through the rational points T and Q, and performing a substitution operation $f \leftarrow f \cdot l_{T',Q'}(n,m)$, by causing the electronic computer to function as a third arithmetic operation unit;

a step of, when a value of the predetermined bit of s in binary representation is 1, performing a substitution operation $T' \leftarrow T'+Q'$, by causing the electronic computer to function as a fourth arithmetic operation unit; and a step of performing an exponentiation operation to the power of $(q^{4h}-1)/r$, by causing the electronic computer to function as a fifth arithmetic operation unit.

12. A non-transitory recording medium recording a pairing computation program, wherein an elliptic curve equation is given as $y^2=x^3+a$, $a \in F_q$, q is a power of a prime number greater than 3, letting an embedding degree be 6h-th degree, h is a natural number, E be an additive group constituted of rational points on a pairing-enabled elliptic curve defined over $F_q^{6h}$, E[r] be a set of rational points of prime order r, and $\phi_q$ be a Frobenius endomorphism, an Ate pairing e is defined, using $$G_1 = E[r] \cap \mathrm{Ker}(\phi_q - [1])$$

$$G_2 = E[r] \cap \mathrm{Ker}(\phi_q - [q]),$$

as a non-degenerate bilinear map $$e: G_2 \times G_1 \to F^*_{q^{6h}}/(F^*_{q^{6h}})^r,$$

and letting $P \in G_1$, $Q \in G_2$, and letting $s=t-1$ using a trace t of the Frobenius endomorphism $\phi_q$, and using a Miller function $f_{s,Q}(\bullet)$, an electronic computer is caused to compute the Ate pairing $e(Q,P)$ as $$e(Q, P) = f_{s,Q}(P)^{\frac{q^{6h}-1}{r}},$$

the pairing computation program characterized by using $v \in F_q^h$ which is a quadratic and cubic non-residue element and becomes 1 by an exponentiation of $f_{s,Q}(P)$ to a power of $(q^{6h}-1)/r$ and a twist curve of $E(F_q^h)$, that is, $E'(F_q^h):y^2=x^3+av^{-1}$, and by causing the electronic computer to perform:

- a step of receiving inputs of said $s=t-1$, P which satisfies $P \in E(F_q)$, and Q' which satisfies $Q' \in E'(F_q^h)$, by causing the electronic computer to function as an input unit;
- a step of performing substitution operations $n \leftarrow x_p v^{-1/3}$, $m \rightarrow y_p v^{-1/2}$ with respect to coordinates of the rational point P $(x_p, y_p)$, by causing the electronic computer to function as a substitution unit;
- a step of performing substitution operations $f \leftarrow 1$, $T \leftarrow Q'$, by causing the electronic computer to function as a substitution unit;
- a step of calculating $1_{T,T}(x_p,y_p)v^{-1/2}$ as $1_{T,T}(n,m)$, instead of calculating $1_{T,T}(x_p,y_p)$ which is a value substituted by coordinates $(x_p,y_p)$ of the rational point P in the left hand side of an equation $1_{T,T}(x,y)=0$ of a tangent line passing through the rational point T, and performing a substitution operation $f \leftarrow f^2 \cdot 1_{T',T'}(n,m)$, by causing the electronic computer to function as a first arithmetic operation unit;
- a step of performing a substitution operation $T' \leftarrow 2T'$, by causing the electronic computer to function as a second arithmetic operation unit;
- a step of, when a value of a predetermined bit of s in binary representation is 1, calculating $1_{T,Q}(x_p,y_p)v^{-1/2}$ as $1_{T',Q'}(n,m)$, instead of calculating $1_{T,Q}(x_p,y_p)$ which is a value substituted by coordinates of the rational point P in the left hand side of an equation $1_{T,Q}(x,y)=0$ of a straight line passing through the rational points T and Q, and performing a substitution operation $f \leftarrow f \cdot 1_{T',Q'}(n,m)$, by causing the electronic computer to function as a third arithmetic operation unit;
- a step of, when a value of the predetermined bit of s in binary representation is 1, performing a substitution operation $T' \leftarrow T'+Q'$, by causing the electronic computer to function as a fourth arithmetic operation unit; and
- a step of performing an exponentiation operation to the power of $(q^{6h}-1)/r$, by causing the electronic computer to function as a fifth arithmetic operation unit.

* * * * *